United States Patent
Yiu et al.

(10) Patent No.: US 11,435,620 B2
(45) Date of Patent: Sep. 6, 2022

(54) QUANTUM DOT LIGHT SOURCE LIQUID CRYSTAL DISPLAYS

(71) Applicant: Nano and Advanced Materials Institute Limited, Hong Kong (HK)

(72) Inventors: Sze Chun Yiu, Hong Kong (HK); Wing Yin Yung, Hong Kong (HK); Chi Hin Wong, Hong Kong (HK); Chi Ho Kwok, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 17/137,399

(22) Filed: Dec. 30, 2020

(65) Prior Publication Data

US 2022/0206340 A1    Jun. 30, 2022

(51) Int. Cl.
*G02F 1/1335* (2006.01)
*G02F 1/1368* (2006.01)
(Continued)

(52) U.S. Cl.
CPC ........ *G02F 1/133614* (2021.01); *C09K 11/02* (2013.01); *C09K 11/565* (2013.01);
(Continued)

(58) Field of Classification Search
CPC ............. G02F 1/133614; G02F 1/1368; G02F 1/133528; G02F 2202/36; C09K 11/565; C09K 11/883; C09K 11/02; G02B 6/005
See application file for complete search history.

(56) References Cited

U.S. PATENT DOCUMENTS 9,664,828 B2    5/2017 Kim et al.
9,701,896 B2 *  7/2017 Nick .................... C09K 11/883
(Continued)

FOREIGN PATENT DOCUMENTS

WO    2019091346 A1    5/2019

OTHER PUBLICATIONS

Lim, J. et al. "Influence of Shell Thickness on the Performance of Light-Emitting Devices Based on CdSe/Zn1-XCdXS Core/Shell Heterostructured Quantum Dots" Advanced Materials, vol. 26, p. 8034-8040.

*Primary Examiner* — Tracie Y Green
(74) *Attorney, Agent, or Firm* — Idea Intellectual Limited; Margaret A. Burke; Sam T. Yip

(57) ABSTRACT

A quantum dot-based color display includes a backlight unit with a light source and light source distribution layer and a photo down-conversion light emissive layer. The photo down-conversion layer has populations of light-emitting Group II-VI core-shell structure quantum dots, the core having an excess amount of a Group II component in a ratio to a Group VI component of approximately 6:1 or greater. The quantum dots include an organic fraction of approximately 20 weight percent to approximately 45 weight percent, the organic fraction including ligands bound to quantum dot surfaces in an as-deposited state and including one or more long-chain fatty acids. Non-barrier polymer films are positioned on either side of the photo down conversion light emissive layer which exhibits photo stability at a light intensity of at least 4000 W/m². A display panel cooperates with the back light unit to form the display.

15 Claims, 20 Drawing Sheets

(51) Int. Cl.
*C09K 11/02* (2006.01)
*C09K 11/88* (2006.01)
*C09K 11/56* (2006.01)
*F21V 8/00* (2006.01)

(52) U.S. Cl.
CPC .......... *C09K 11/883* (2013.01); *G02F 1/1368* (2013.01); *G02F 1/133528* (2013.01); *G02B 6/005* (2013.01); *G02F 2202/36* (2013.01)

(56) References Cited

U.S. PATENT DOCUMENTS

| | | |
|---|---|---|
| 10,526,535 B2 | 1/2020 | Qiu et al. |
| 11,088,357 B2* | 8/2021 | Jung .................... H01M 50/116 |
| 11,121,290 B2* | 9/2021 | Kwok ................... H01L 33/504 |
| 2014/0022779 A1* | 1/2014 | Su ............................ F21V 9/38 |
| | | 362/231 |
| 2016/0027848 A1* | 1/2016 | Liu ..................... H01L 27/1214 |
| | | 257/40 |
| 2016/0161065 A1* | 6/2016 | Sung ....................... B32B 27/38 |
| | | 362/84 |
| 2019/0196075 A1* | 6/2019 | Iwasaki ................ G02B 5/3033 |
| 2019/0211265 A1* | 7/2019 | Park ....................... G02B 6/005 |
| 2020/0217974 A1* | 7/2020 | Park ....................... C09K 11/70 |
| 2020/0301207 A1* | 9/2020 | Yoshikawa .............. G02B 5/30 |
| 2020/0399536 A1* | 12/2020 | Kim ...................... G03F 7/0007 |
| 2021/0301097 A1* | 9/2021 | Murata ................ C09K 11/883 |

* cited by examiner

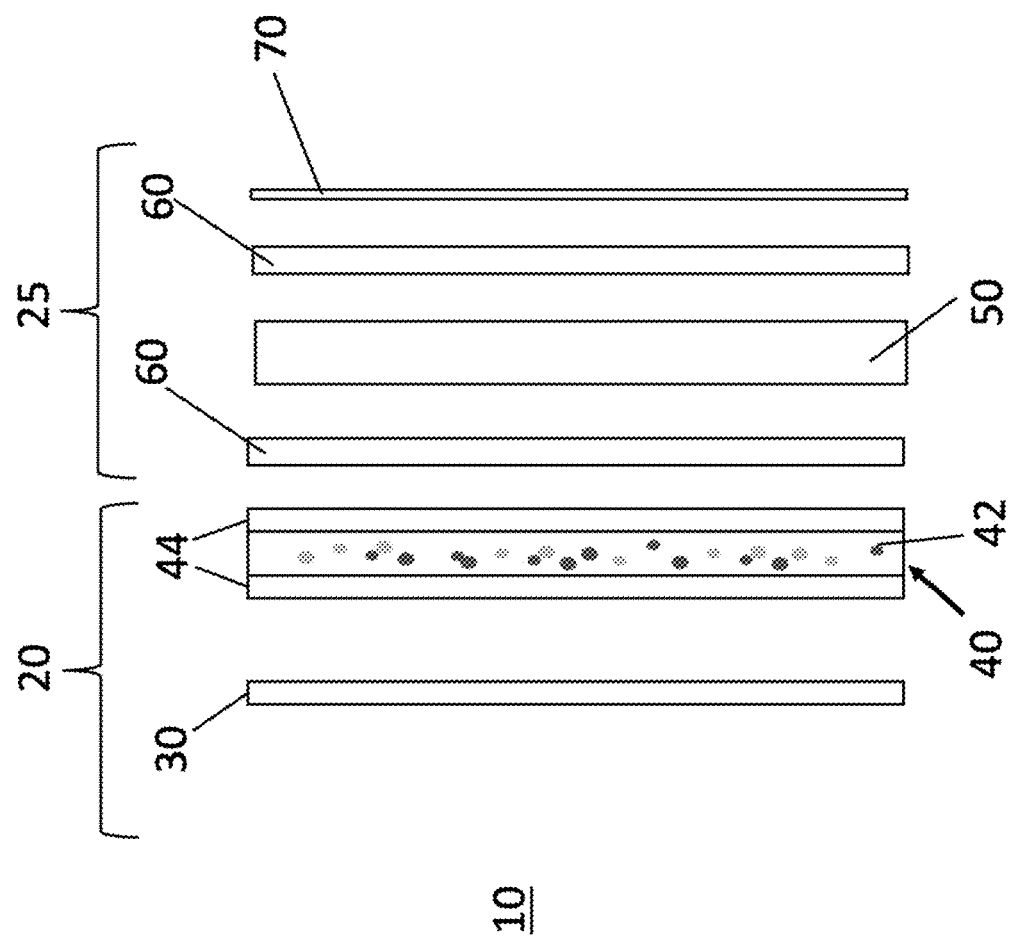

QUANTUM DOT LIGHT SOURCE LIQUID CRYSTAL DISPLAYS

FIELD OF THE INVENTION

The present invention relates to the field of quantum-dot-based films in light sources for liquid crystal displays, and methods of making quantum dot films with good surface passivation and ligand protection that do not require barrier layers.

BACKGROUND

The size-dependent photoluminescence of quantum dot (QD) materials has drawn the attention of both scientists and engineers since the early 1980s. Owing to the quantum confinement, QDs exhibit size-tunable emission over the whole visible spectrum. In addition, QDs provide narrow emission band width and high quantum yield, resulting in exceptional color purity and wide color gamut for display applications. Several material categories may be used for QDs, including Groups II-VI and III-V semiconductors and ceramics such as lead halide perovskites.

Conventional displays use a rare-earth down conversion phosphor (i.e., YAG:Ce) layer in their back-lighting units. Down-converting QD layers absorb light of a one wavelength, e.g., blue light, and emit longer-wavelength light such as green or red light. Thus, QD-based displays typically use a blue LED light source and replace conventional phosphors with QD films containing green and red color QDs. Due to the intrinsic narrow emission bandwidth and high quantum efficiency in QDs, the QD film offers perceived enhancement in brightness and color saturation compared to the prior art broad emission phosphors. Moreover, with much less light being filtered out, the QD film benefits from low power consumption with lower blue light flux to achieve the same performance as prior art phosphor-based displays.

However, QD materials are generally not as robust as the prior art phosphors. The QD layer can degrade due to temperature, moisture, and atmospheric oxygen. Further, the exposure to the high intensity light source in a display can also degrade the quantum dot layer. Therefore, to achieve commercialization of QD displays, several techniques have been used to prevent degradation. Most frequently, a pair of barrier films (polymer-inorganic oxide hybrid) with low water vapor transmission rates (WVTR) and low oxygen transmission rate (OTR) are required to sandwich the QD layer. Commercial products use these barrier films to protect the quantum dots from different operating conditions while the quantum dot adhesive is coated and sandwiched between the barrier protective films to form the color conversion film structure. In order to achieve device lifetimes of thousands of hours, water vapor transmission rates (WVTR) must be reduced to $10^{-5}$ to $10^{-3}$ $g/m^2/day$. To achieve this target, the barrier film is made by organic and inorganic materials which are deposited by chemical vapor deposition (CVD) on PET film and provide protection to quantum dots from humidity, oxygen and optical stability. Because of the complicated deposition process, the barrier films will account for 50% of the bill of material (BOM) cost.

SUMMARY OF THE INVENTION

The present invention relates to a quantum dot-based color display having a backlight unit including a light source and light source distribution layer, and a photo down-conversion light emissive layer comprising first and second populations of light-emitting Groups II-VI core-shell structure quantum dots. At least a core portion of the light-emitting Groups II-VI core-shell structure quantum dots has an excess amount of a Group II component, the Group II component being in a weight ratio to a Group VI component of approximately 6:1 or greater. The first population of light-emitting Groups II-VI core-shell structure quantum dots emits light in a wavelength range of approximately 510-530 nm and the second population of quantum dots emits light in a wavelength range of approximately of 630-640 nm.

The light-emitting Groups II-VI core-shell structure quantum dots include an organic fraction in an amount of approximately 20 weight percent to approximately 45 weight percent; the organic fraction includes ligands bound to quantum dot surfaces. The ligands are attached to the quantum dot surfaces in an as-deposited state and include one or more long-chain fatty acids, the long-chain fatty acids each having an aliphatic tail of at least 13 carbon atoms.

First and second non-barrier polymer films having a water vapor transmission rate of >1 $g/m^2$ day are positioned on either side of the photo down conversion light emissive layer which exhibits photo stability at a light intensity of either 0.16-50 $W/m^2$ in 65° C. at 95% relative humidity (R.H.) and 85° C. thermal weathering conditions, or 4000 $W/m^2$ in 50° C. at 50-70% R.H. aging conditions;

A display panel cooperates with the back light unit and includes a liquid crystal layer and a transistor-based switching matrix for driving the liquid crystal layer, two or more polarizers positioned on either side of the liquid crystal layer and a screen to form the display.

BRIEF DESCRIPTION OF THE DRAWINGS

FIG. 1 is a schematic depiction of a display according to an embodiment;

DETAILED DESCRIPTION

Figure 2B:
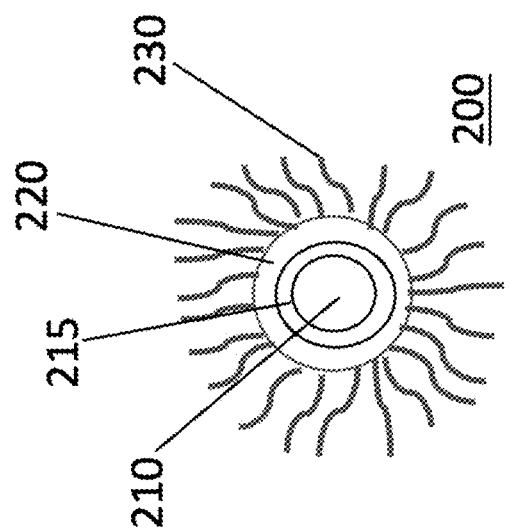
FIGS. 2A-2B respectively depict a prior art quantum dot and a quantum dot according to the present invention.

Turning to the drawings in detail, FIG. 1 schematically depicts a display 10 according to an embodiment of the present invention. Broadly, the display 10 includes two main portions, back light unit 20 and display panel portion 25. Back light unit includes a light source along with a light guide plate 30 to ensure a uniform distribution of light from the source to a light conversion layer 40. In an exemplary embodiment, the light source may include one or more blue light-emitting diodes (LEDs). The light conversion layer 40 includes a core region that include quantum dots 42 in a matrix. The core is surrounded by non-barrier polymer films 44. The non-barrier-polymer films 44 have a water vapor transmission rate of >1 g/m$^2$ day. Polymer films 44 may be selected from one or more of polyethylene terephthalate, polyethylene, polyimide, polyether sulfone, polyethylene naphthalate, polyacrylonitrile or polypropylene the films as set forth in Table 1 below which lists these materials and their water vapor transmission rate (WVTR). As seen from Table 1, the polymer films used for layers 44 have a water vapor transmission rate substantially higher than the barrier films needed for prior art quantum dot layers, which are on the order of 10$^{-3}$ to 10$^{-5}$ g/m$^2$/day:

TABLE 1

| Material | WVTR g/m2/day |
|---|---|
| PET (polyethylene terephthalate) | 3.9-17 |
| PEN (polyethylene naphthalate) | 7.3 |
| PE (polyethylene) | 1.2-5.9 |
| PP (polypropylene) | 1.2-5.9 |
| PES (polyethersulfone) | 14 |
| PI (polyimide) | 0.4-21 |

The display panel portion 25 includes a liquid crystal layer with a transistor-based switching matrix 50 surrounded by polarizers 60 and visible through display screen 70. The liquid crystal portion may include additional optical films as well as a color filter. Further details of liquid crystal displays that may use the light conversion layer 40 are described in Chen et al., *Light Science Appl. Vol.* 7, 17168 (2018), the disclosure of which is incorporated by reference herein.

The light conversion layer 40 may be a photo down-conversion light emissive layer comprising first and second populations of light-emitting Groups II-VI core-shell structure quantum dots, at least a core portion of the Groups II-VI core-shell structure quantum dots having an excess amount of a Group II component, the Group II component being in a ratio to a Group VI component in an amount of approximately 6:1 or greater. The first population of quantum dots emitting light in a wavelength range of approximately 510-530 nm and the second population of quantum dots emitting light in a wavelength range of approximately of 630-640 nm. Thus, when the light source is a blue light source, a portion of the blue light is converted into green light and a portion of the blue light is converted into red light. The combined blue, green, and red light will result in improved output from the color filter due to less blue/green leakage and less light absorption. This improves the output color gamut as will be described in further detail below.

The quantum dots include an organic fraction in an amount of approximately 20 weight percent to approximately 45 weight percent. The organic fraction includes ligands bound to the quantum dot surfaces. As will be discussed in further detail below, the ligands are attached to the quantum dot surfaces in an as-deposited state. That is, there is no ligand-exchange step following the formation of the quantum dots. The ligands include one or more long-chain fatty acids, the long-chain fatty acids each having an aliphatic tail of at least 13 carbon atoms. The photo down conversion light emissive layer exhibiting photo stability at a light intensity of 0.16-50 W/m$^2$ in either 65° C. at 95% R.H. or 85° C. thermal weathering conditions, or 4000 W/m$^2$ in either 50° C. at 50-70% R.H. aging conditions.

Figure 2A:
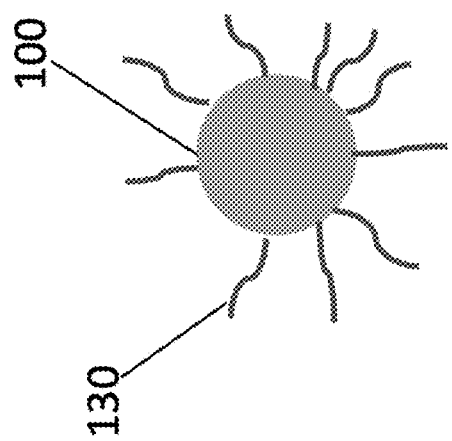

FIGS. 2A and 2B schematically depict a prior art quantum dot 100 (FIG. 2A) and a quantum dot 200 (FIG. 2B) according to the present invention. In the present invention, the stability of the quantum dots themselves has been improved, eliminating the need for expensive barrier layers. This has been achieved by refining the composition of the quantum dot, including the composition of a quantum dot core 210 and inorganic shell 220 along with the surrounding organic ligand 230. The inorganic shell 220 controls the confinement of charges and protects the core 210 from degradation. The alloy or intermediate shell 215 reduces the lattice mismatch between core 210 and shell 220, and thus enhances the thermal and photostability of the quantum dot against different environmental factors. Further, the number and size of the organic ligands 230 stabilizes the quantum dots by reducing fragile dangling bonds through secure anchoring to the quantum dot surface. The ligand also provides good steric hindrance to minimize the quantum dot's exposure to environmental moisture and oxygen. In contrast, the prior art quantum dot ligands 130 are insufficient to protect the quantum dot from environmental degradation.

The quantum dots of the present invention are selected from Groups II-VI quantum dots that have a core-shell structure. At least a core portion of the Groups II-VI core-shell structure has an excess amount of a Group II component. In particular, the Group II component is selected to be in a ratio to the Group VI component in an amount of approximately 6:1 or greater. The intermediate shell 215 may include CdZnSeS, CdSeS, ZnSeS, CdZnSe, CdZnS, CdSe, CdS, ZnSe, ZnS while the outer shell 220 may include CdZnS, CdS, Zn. The ligands 230 are formed during production of the quantum dot without a ligand exchange step. The ligands 230 include one or more long-chain fatty acids, the long-chain fatty acids each having an aliphatic tail of at least 13 carbon atoms. Exemplary ligands include oleic acid, myristic acid, stearic acid, linoleic acid, elaidic acid, and palmitic acid; however, other ligands may also be used.

Synthesis of Quantum Dots

The preparation of II-VI QD is based on a hot-injection method of metal and chalcogen precursors in a solvent under inert atmosphere. However, other techniques may also be used to form the quantum dots for use in the present invention. In general, one or more cationic group II metal precursors including but not limited to CdO, $Cd(OAc)_2$, ZnO, $Zn(OAc)_2$ are dissolved in a solvent with capping ligands. The solvent must be able to dissolve the precursors and is also required to withstand a high reaction temperature of between 220 to 320° C. Exemplary solvents include, but are not limited to, trioctylphosphine, oleylamine, hexadecylamine, and 1-octadecene (1-ODE). To control the reactivity of the precursors and the quantum dot crystal quality, the capping ligand for metal precursors may be selected from, but not limited to oleylamine, oleic acid, myristic acid, and stearic acid. To enrich the control of composition of QD composition and growth, one or more anionic group VI chalcogen precursors may be selected from, but not limited to, selenium, sulphur, 1-dodecanthiol, 1-octanethiol, thiourea and selenourea. The solvent and capping ligand to dissolve the chalcogen precursors are selected from trioctylphosphine, oleylamine and 1-octadecene (1-ODE). The separated precursor solutions were degassed between 20 to 150° C. and stored under an inert atmosphere before use.

To form the core of the II-VI quantum dots, one or more chalcogen precursor solutions is rapidly injected in the metal precursor solution at 220 to 320° C.; the combined solutions are held for period of time from approximately 1 to approximately 20 minutes for core growth. The shell is subsequently formed by sequential introduction of both cationic (Group II) and anionic (Group VI) precursor solutions at 220 to 320° C. followed by holding for a period of time from 5 to 120 minutes to allow the precursors to deposit on the core surface forming both the intermediate and outer core layers. Note that, depending upon selected growth conditions, one or more intermediate layers may be formed. Exemplary cationic precursor solutions include cadmium oleate, cadmium myristate, zinc oleate, and zinc stearate although other precursor cation solutions may also be used. Exemplary anionic precursor solutions include selenium tiroctylphosphine, sulphur-trioctylphosphine and 1-dodecanthiol, although other solutions may also be used. Once a desired quantum dot size is achieved, for example, an approximate particle diameter of 4 to 10 nanometers, the reaction mixture is cooled to room temperature for precipitation.

A solvent to remove impurities and precipitate the quantum dot is selected from, but not limited to acetonitrile, ethanol, acetone and ethyl acetate. The quantum dot precipitated was then collected and stored in solvent, including but not limited to hexane, octane, chloroform, acrylate monomers (such as isobornyl acrylate and tert-butyl acrylate).

The as-precipitated quantum dot includes ligands strongly bound to the surface. These as-deposited ligands are sufficient to protect the quantum dot from atmospheric moisture without the need to perform a ligand-exchange step to replace the as-deposited ligands.

Fabrication of Quantum Dot Films

To fabricate the down-conversion light emissive layer for the displays of the present invention, a quantum dot solution is mixed with a UV-curable polymer adhesive precursor. Either a monomer or oligomer mixture may be used which will be crosslinked upon UV irradiation. The monomers or oligomers are those which will form silicon, acrylate, or epoxy polymers upon crosslinking. The quantum dot monomer solution with a UV-curable polymer precursor may be processed under oxygen or nitrogen (with no blue light) conditions before UV-curing. The use of inert gas and no blue light in film fabrication are expected to remove the oxygen in both quantum dot solution and polymer adhesive, so as to improve the photo stability under different aging conditions. The quantum dot monomer solution with a UV-curable polymer precursor may be formed into a layer using a printing process such as a doctor blade process; however, other layer fabrication techniques may be selected. In an example, the layer is embedded between mould films and spacers, and the movement of a doctor blade across the surface provides an even film thickness along the film. The thickness of the film can be controlled in a range of 100-250 μm. The film is UV cured to provide protection of the quantum dots against moisture and air by solidification. In particular, the film may be cured in an inert atmosphere and under ambient light conditions where the light does not include light at a wavelength of 380-480 nm.

Following curing, the quantum dot film is sandwiched by protective layers such as polyethylene-terephthalate (PET), polyacrylonitrile (PAN), polyimide (PI), polyethylene naphthalate (PEN) films, with a thickness of 20-100 um.

Organic Fraction- and II:VI Ratio-Determined Stability and Reliability Studies of QD Films To better illustrate the stability/reliability of the quantum dot films manufactured by the above processes, a series of industrial recognized aging test were performed, including 85° C. aging for 500 hours under blue light illumination and 65° C. at 95% R.H. aging for 1000 hours under blue light illumination.

To evaluate the results, measurement of the absolute quantum yield (Abs. QY) and white point position in CIE chromaticity diagram were performed, before and after the aging test. According to the results, two parameters were found to impact the quantum dot film stability. Together with an inductively coupled plasma mass spectrometry (ICP-MS) study, it was determined that the organic fraction surrounding the quantum dots is the first factor determining the stability, especially in high humidity (i.e. 65° C. at 95% R.H. aging test). A threshold of organic fraction is determined, which is greater than or equal to approximately 20 wt %, to maintain 90% retention of Abs. QY with less than 0.01 deviation in white point position of a CIE chromaticity diagram. The organic fraction is derived from the organic ligands (i.e. OA and TOP) passivating the surface of quantum dots during the quantum dot synthesis. With the long alkyl chain provided by organic ligands, the quantum dots were hydrophobic on the surface and sterically hinder entry of environmental moisture. The larger the organic fraction present, the greater the protection level that was obtained. In addition, the enhanced hydrophobicity from the organic fraction provides improved compatibility with the polymer backbone of the UV-cured polymer adhesive during film fabrication, further improving the stability of the quantum dot films.

Another important parameter is the Group II:VI ratio in the composition of the Groups II-VI quantum dots. Aging tests were performed on CdSe quantum dot films. From the 85° C. aging condition, a higher ratio of Cd:Se (e.g., at least 6:1) was found to improve the quantum dot film stability at high temperature, as compared to a lower ratio counterpart (e.g., 2:1). Without being bound by any theory, it is believed that excess of the II component may distribute in the intermediate and outer shell layer, besides forming the CdSe core at the beginning of reaction. With an increased Cd content in the shell layers, the quantum dot surface may be more chemically robust under high thermal stress.

As a result, by synthetically controlling the quantum dots with both optimal II:VI ratio (≥6:1) and organic fraction (≥20 wt %), the QD films achieve the enhanced stability under blue light emission in long term use in display application.

EXAMPLES

Example 1. A Method to Prepare a QD Film with Green and Red Quantum Dots

To fabricate green-emitting quantum dots, cadmium oxide (0.75 mmol) and zinc acetate dehydrate (10 mmol) were dissolved in oleic acid (OA) (13 mL) and 1-octadecene (1-ODE) (37 mL), and degassed at 120° C. for 45 minutes. The reaction mixture was then heated to 300° C. Selenium (0.5 mmol) and sulphur (10 mmol) in trioctylphosphine (TOP) (5 ml) was then swiftly injected and allowed to heat at 300° C. for 9 minutes. Then, dodecanthiol (1 mmol) was injected and held at the same temperature for 1 minute. For the shell growth, sulphur in TOP (2.26 mmol in 1.1 mL TOP), cadmium oleate (0.75 mmol cadmium acetate dehydrate in 0.75 mL OA and 0.75 mL ODE) and zinc oleate (1.50 mmol zinc acetate dehydrate in 1.5 mL OA and 1.5 mL ODE) were injected sequentially and the reaction was held at the same temperature for 10 minutes. The shell precursor injection was repeated twice and held for 10 minutes each. The reaction was cooled down and precipitated with acetone twice. The green QD was collected and dissolved in hexane or monomer (Isobornyl acrylate) solution (100 mg/mL) for later use.

To fabricate red-emitting quantum dots, cadmium oxide (1 mmol) and myristic acid (3 mmol) were dissolved in 1-ODE (15 mL), and degassed at 120° C. for 30 minutes. The reaction mixture was then heated to 300° C. Selenium in TOP (0.5 mmol in 0.25 mL TOP) was injected and held for 3 minutes. Zinc oleate (1.50 mmol zinc acetate dehydrate in 1.5 mL OA and 1.5 mL ODE) and dodecanthiol (1 mmol) were added and held for 30 minutes at the same temperature. The temperature was cooled to 290° C. Cadmium oleate (1 mmol cadmium acetate dehydrate in 1 mL OA and 1 mL ODE), zinc oleate (2 mmol zinc acetate dehydrate in 2 mL OA and 2 mL ODE) and sulphur in TOP (3 mmol in 1.5 mL TOP) were added sequentially and held for 10 minutes. These Cd, Zn and S shelling were repeated twice at 290° C. The reaction was cooled down and precipitated with acetone twice. The red QD was collected and dissolved in hexane or monomer (Isobornyl acrylate) solution (100 mg/mL) for later use.

Figure 3B:
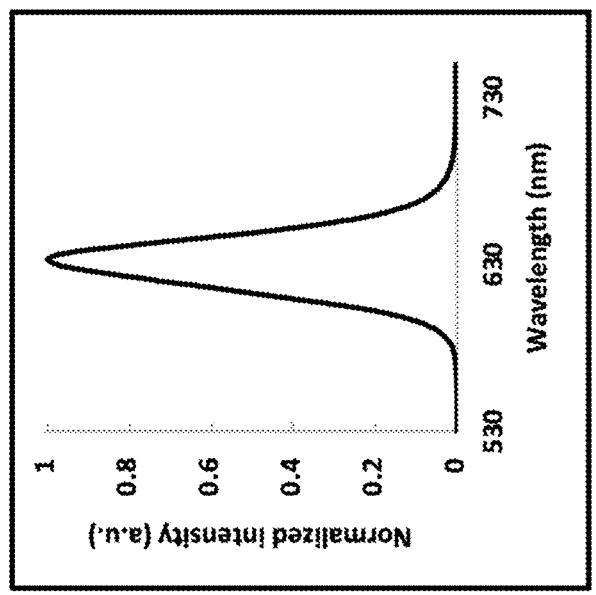
FIGS. 3A-3B are emission spectra of green and red quantum dot solutions, respectively.
Figure 3A:
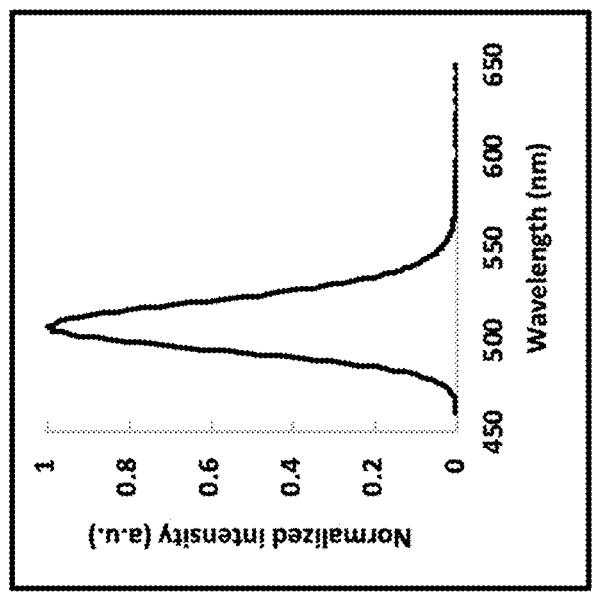

The green QD solution exhibits a narrow FWHM of 31 nm with emission peak at 507 nm and high absolute quantum yield (Abs. QY) of 64.7% as seen in FIG. 3. The red QD solution were exhibited a narrow FWHM of 36 nm with emission peak at 633 nm and high Abs. QY of 70.7% as seen in FIG. 3B.

Figure 4:
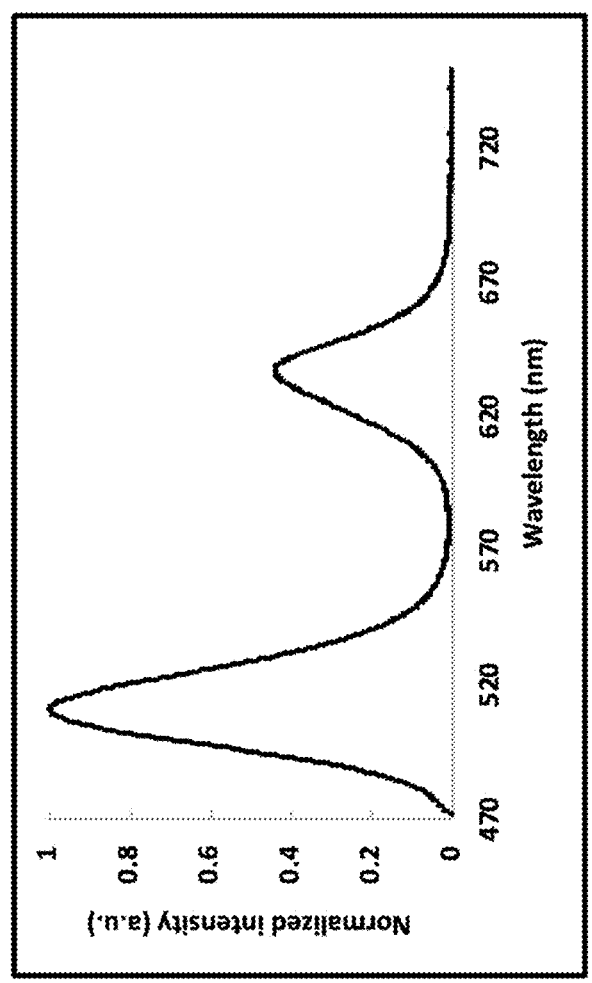
FIG. 4 is an emission spectrum of a quantum dot film.

For the film fabrication, the green quantum dot monomer solution (250 μL) and red QD monomer solution (25 μL) were mixed with UV-cured acrylate-based polymer (1 g) under nitrogen filled atmosphere. A quantum dot film with a thickness of 100 microns was obtained following. UV irradiation. The quantum dot film exhibited emission peaks at 511 and 637 nm with FWHM of 34 and 33 nm, respectively. The Abs. QY obtained from the both the green and red region was 58.1% as seen in FIG. 4.

Example 2. Reliability Study of the Quantum Dot Film with Different Organic Fraction in GQDs Under 65° C. at 95% R.H. Aging & Blue Light Flux Condition-1 (0.16 W/m$^2$)

Figure 5:
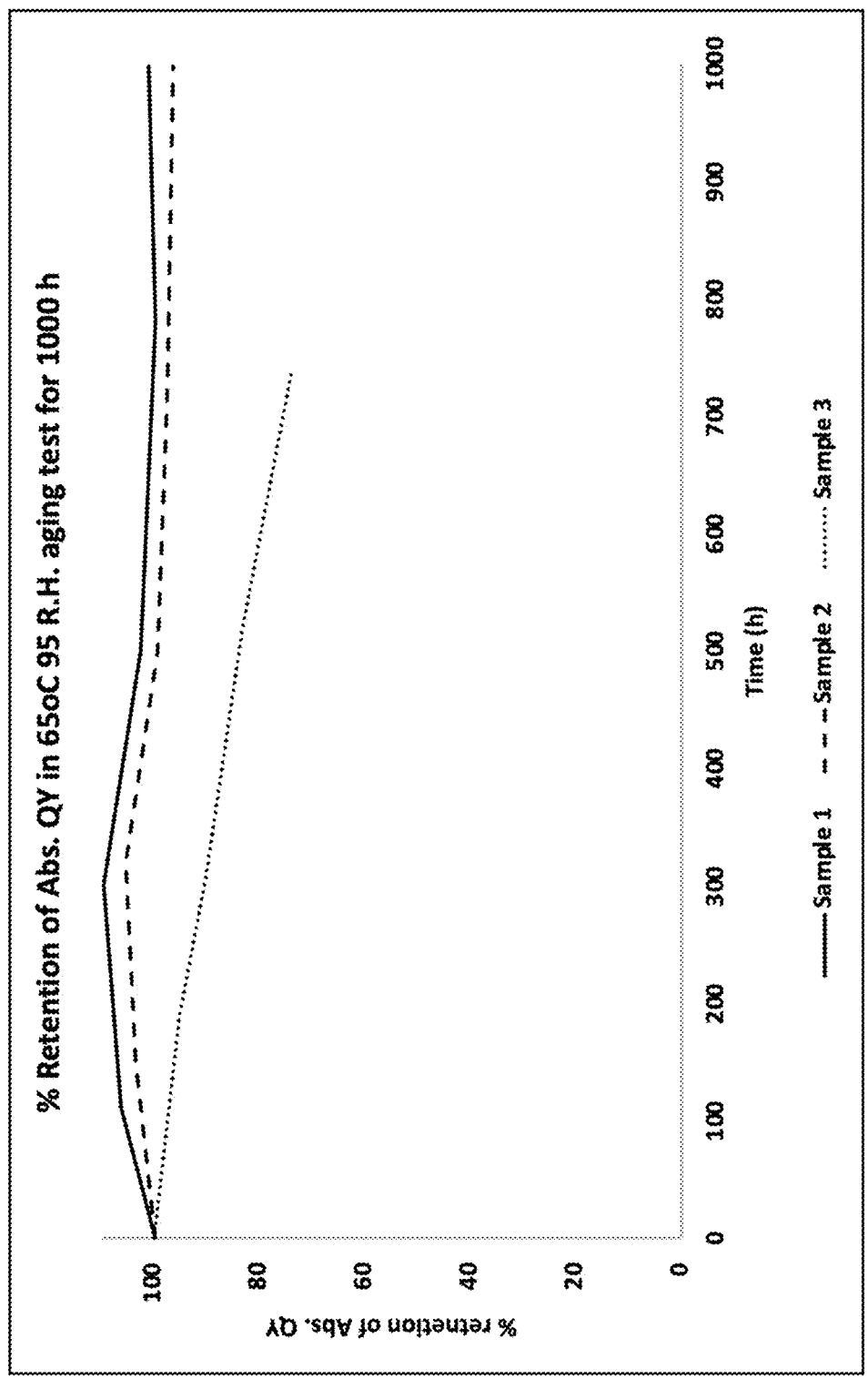
FIG. 5 is a reliability study of QD film with different organic fractions of green QDs under 65° C. at 95% R.H. & blue light flux condition-1 (0.16 $W/m^2$)
Figure 6:
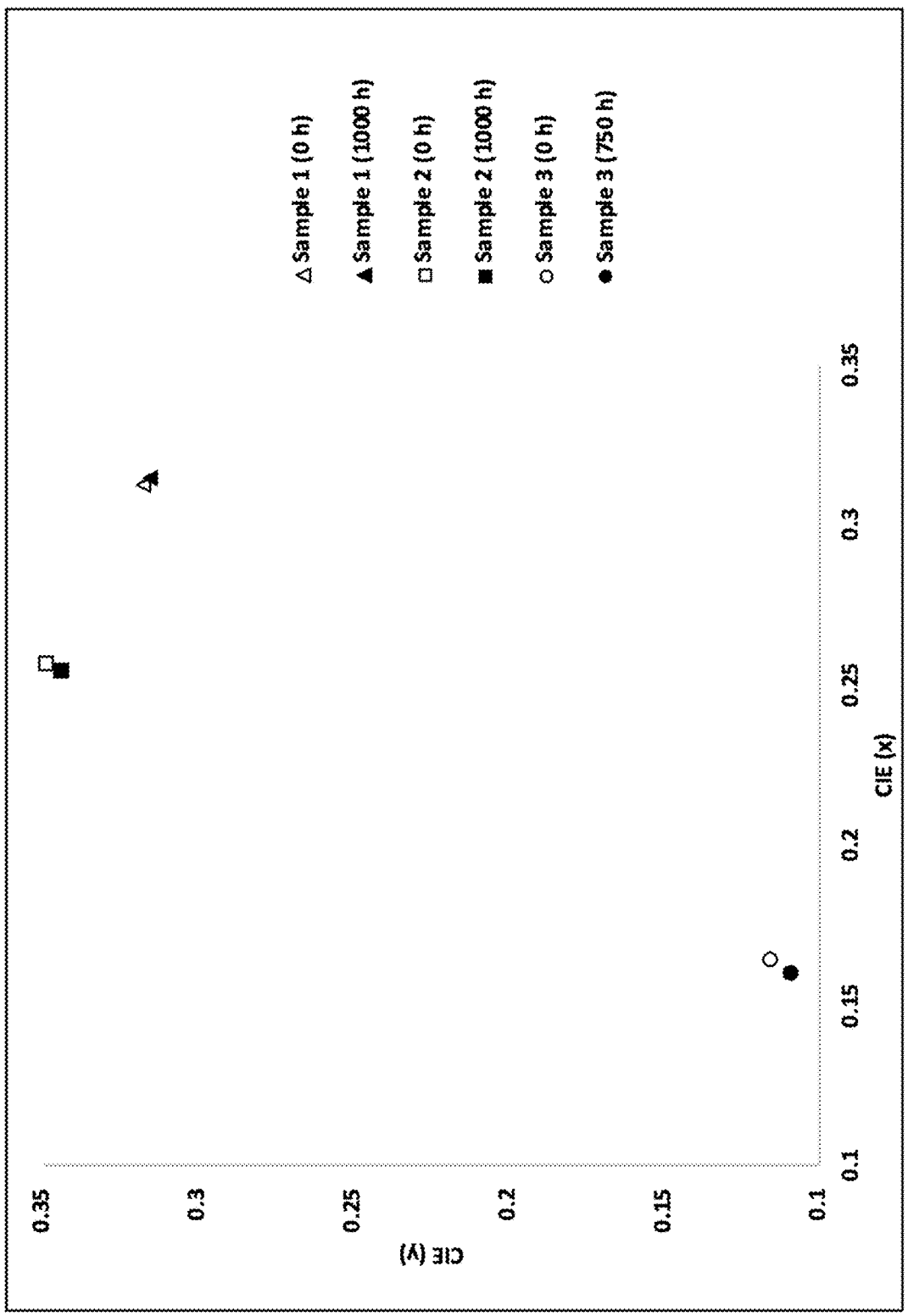
FIG. 6 is a white point position movement of samples 1 to 3 in 65° C. at 95% R.H. aging test for 1000 h upon blue light flux condition-1 (0.16 $W/m^2$)

To illustrate the effect of organic fraction on quantum dot films in 65° C. at 95% R.H. weathering condition, 3 quantum dot film examples were put under the mentioned condition with blue light flux condition-1 (Irradiance: 0.16 W/m$^2$) for 1000 hours. Three quantum dot film examples were prepared with each film differing only different in organic fraction (by ICP-MS) surrounding the green quantum dots, sample 1 (39.7%), sample 2 (22.4%) and sample 3 (9.3%), respectively (Table 1). The wt % of Cd:Se ratios of the three samples were maintained at 7:1 to 11:1 to lower the impact of composition to film stability. For red quantum dot films, the Cd:Se ratio (wt %) and organic fraction were maintained at 8:1 and ~40%. Following the decreasing trend in organic fraction, the % retention of Abs. QY were found to be 101%, 96% and 74% for samples 1, 2 and 3, respectively (FIG. 5). The enhanced stability in samples 1 and 2 (i.e. organic fraction ≥20 wt %) is expected to be strengthened by the increased hydrophobic interaction in organic fraction, which then blocks the entry and degradation of moisture on the quantum dots. To further illustrate the emissive stability in quantum dot films, the white point position in CIE chromaticity diagram were examined. The change of all three samples were maintained at within 0.01, but the change of both coordinates in samples 3 were found to be the greatest among three (i.e., ~0.005) as seen in FIG. 6.

TABLE 2

Elemental composition, organic fraction and emissive characters of examples in 65° C. at 95% R.H. aging test for 1000 h upon blue light flux condition-1 (0.16 W/m$^2$):

|  | Sample 1 | Sample 2 | Sample 3 |
|---|---|---|---|
| Cd:Se (wt %) of GQDs | 23.0:3.0 | 23.0:2.0 | 22.0:2.0 |
| Organic fraction (wt %) of GQDs | 39.7 | 22.4 | 9.3 |
| Retention % of Abs. QY in 65° C. at 95 R.H. aging test | 101% | 96% | 74% (750 h) |
| Δ CIE (x, y) in 65° C. at 95 R.H. aging test | <0.01 | <0.01 | <0.01 |

3. A Reliability Study of the QD Film with Different Organic Fraction in GQDs Under 65° C. at 95% R.H. Aging & Blue Light Flux Condition-2 (1.47 W/m$^2$)

Figure 7:
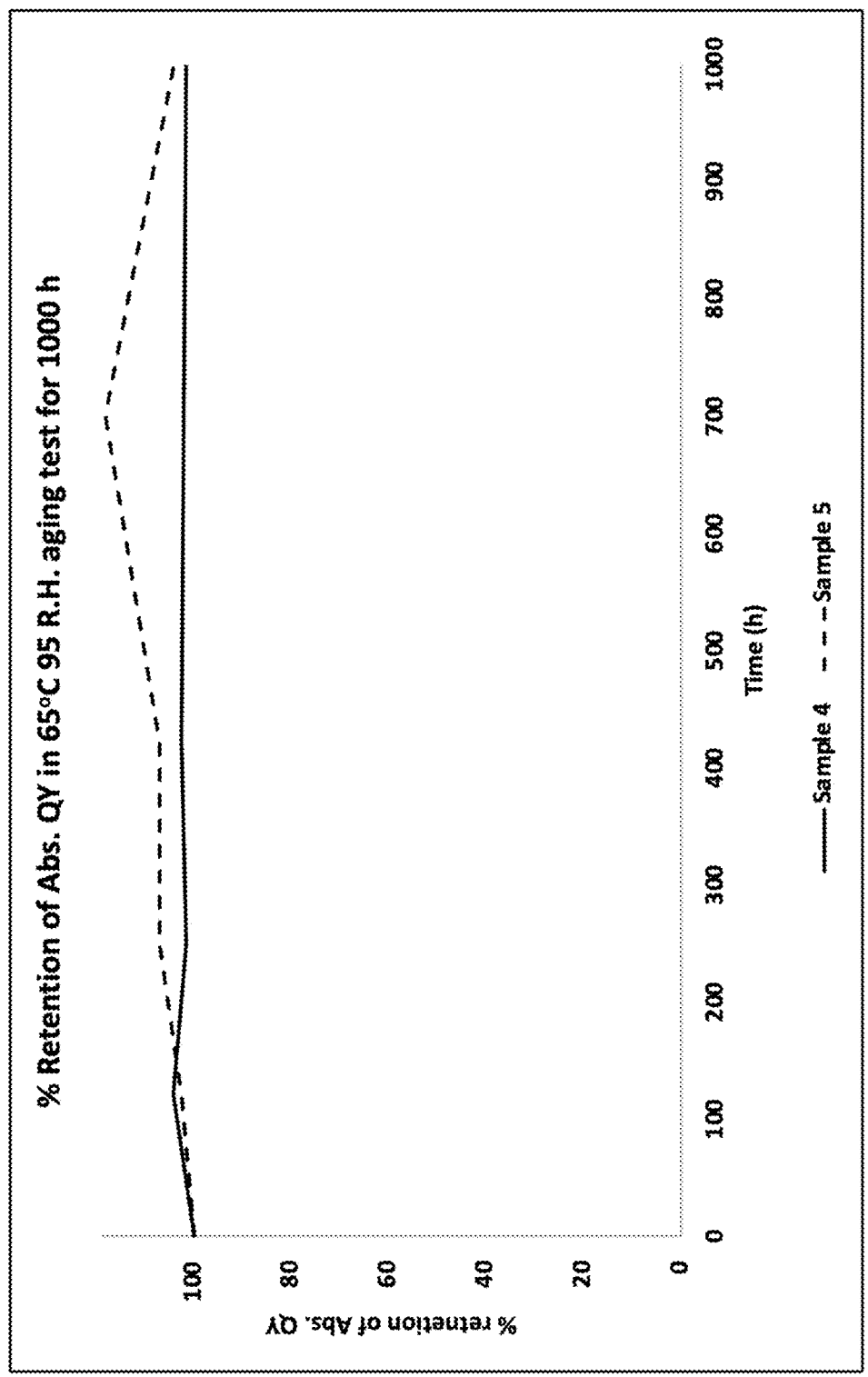
FIG. 7 is a reliability study of QD film with different organic fraction of green QDs under 65° C. at 95% R.H. & blue light flux condition-2 (1.47 $W/m^2$)
Figure 8:
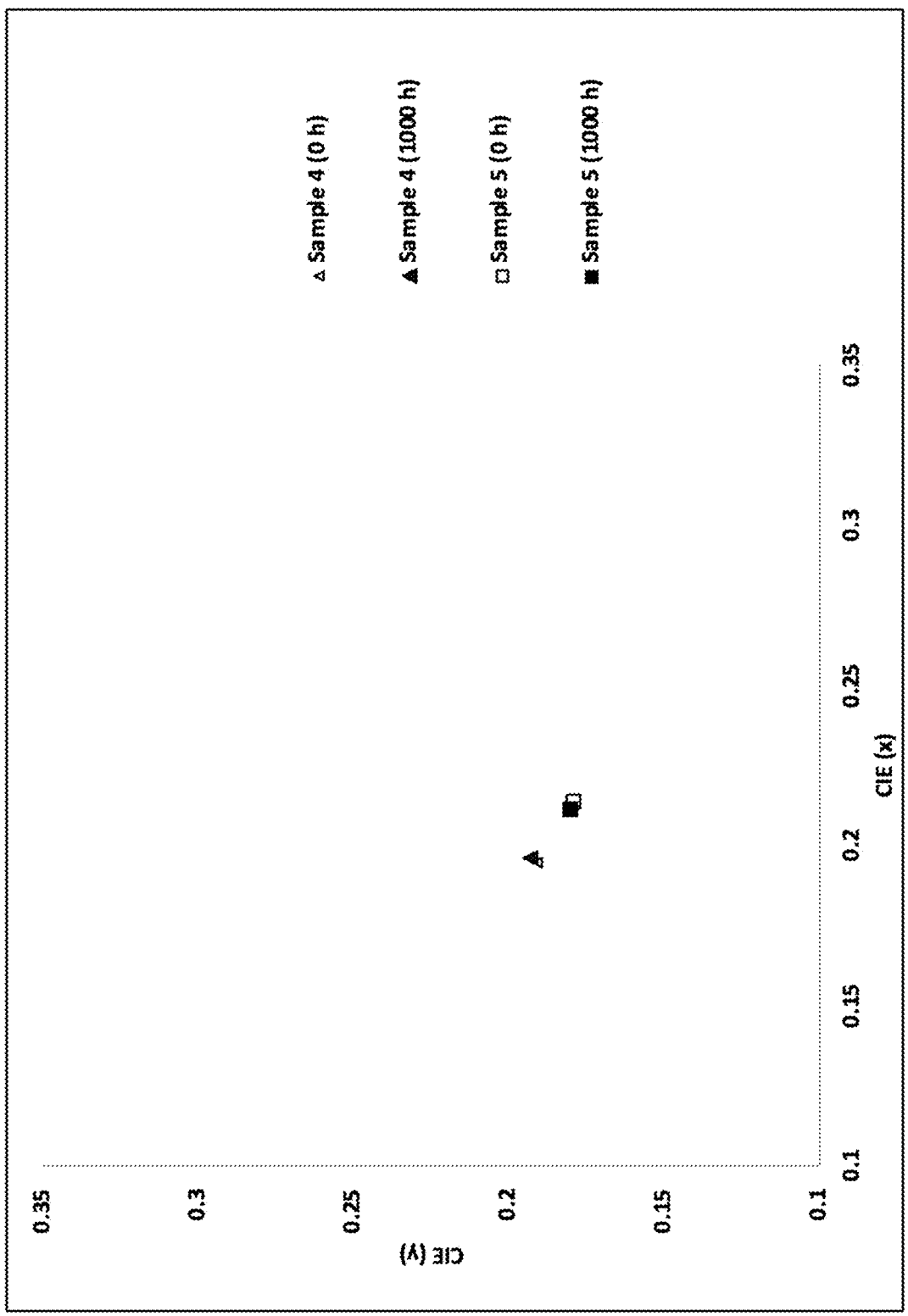
FIG. 8 is a white point position movement of samples 4 and 5 in 65° C. at 95% R.H. aging test for 1000 h upon blue light flux condition-2 (1.47 $W/m^2$).

To further demonstrate the protective function of the organic fraction for quantum dot films in a 65° C. at 95% R.H. weathering condition, two quantum dot film samples were subjected to the humidity levels at another blue light flux condition (Irradiance: 1.47 W/m$^2$) for 1000 hours. Due to the poor result obtained using low organic fraction quantum dots (i.e. ≤10 wt %), only samples with an organic fraction greater than 20 wt % were examined. Similar to the previous study, the two samples were different in the organic fraction surrounding green quantum dots, samples 4 (39.7%) and 5 (25.6%), respectively (Table 2). For red quantum dots, the Cd:Se ratio (wt %) and organic fraction were maintained at 8:1 and ~40%. Both samples 4 and 5 maintained >100% Abs. QY retention after 1000 hours in 65° C. at 95% R.H. weathering with blue light flux condition-2 (Irradiance: 1.47 W/m$^2$) (FIG. 7). Due to the enhanced stability governed by the hydrophobic organic fraction, the CIE coordinates change of both samples were less than 0.01 (FIG. 8).

TABLE 3

Elemental composition, organic fraction and emissive characters of examples in 65° C. at 95% R.H. aging test for 1000 h upon blue light flux condition-2 (1.47 W/m$^2$):

| | Sample 4 | Sample 5 |
|---|---|---|
| Cd:Se (wt %) of GQDs | 23.0:3.0 | 24.0:3.0 |
| Organic fraction (wt %) of GQDs | 39.7 | 25.6 |
| Retention % of Abs. QY in 65° C. at 95 R.H. aging test | 101% | 104% |
| Δ CIE (x, y) in 65° C. at 95 R.H. aging test | <0.01 | <0.01 |

Example 4. A Reliability Study of the Quantum Dot Film with Different Cd:Se Ratio in Green Quantum Dots Under 85° C. Aging and Blue Light Flux Condition-1 (0.16 W/m$^2$)

Figure 9:
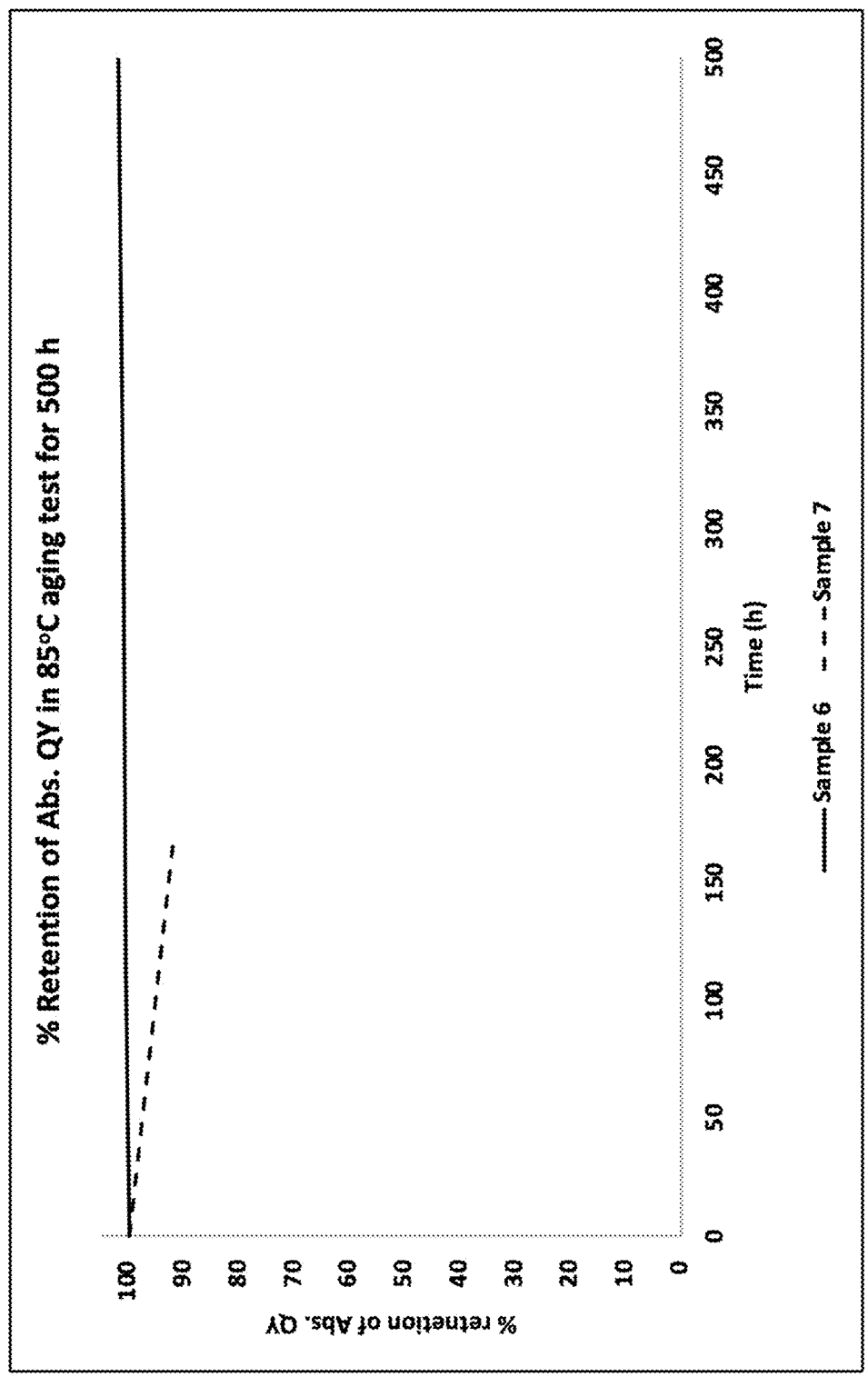
FIG. 9 is a reliability study with different composition of green QDs under 85° C. & blue light flux condition-1 (0.16 $W/m^2$)
Figure 10:
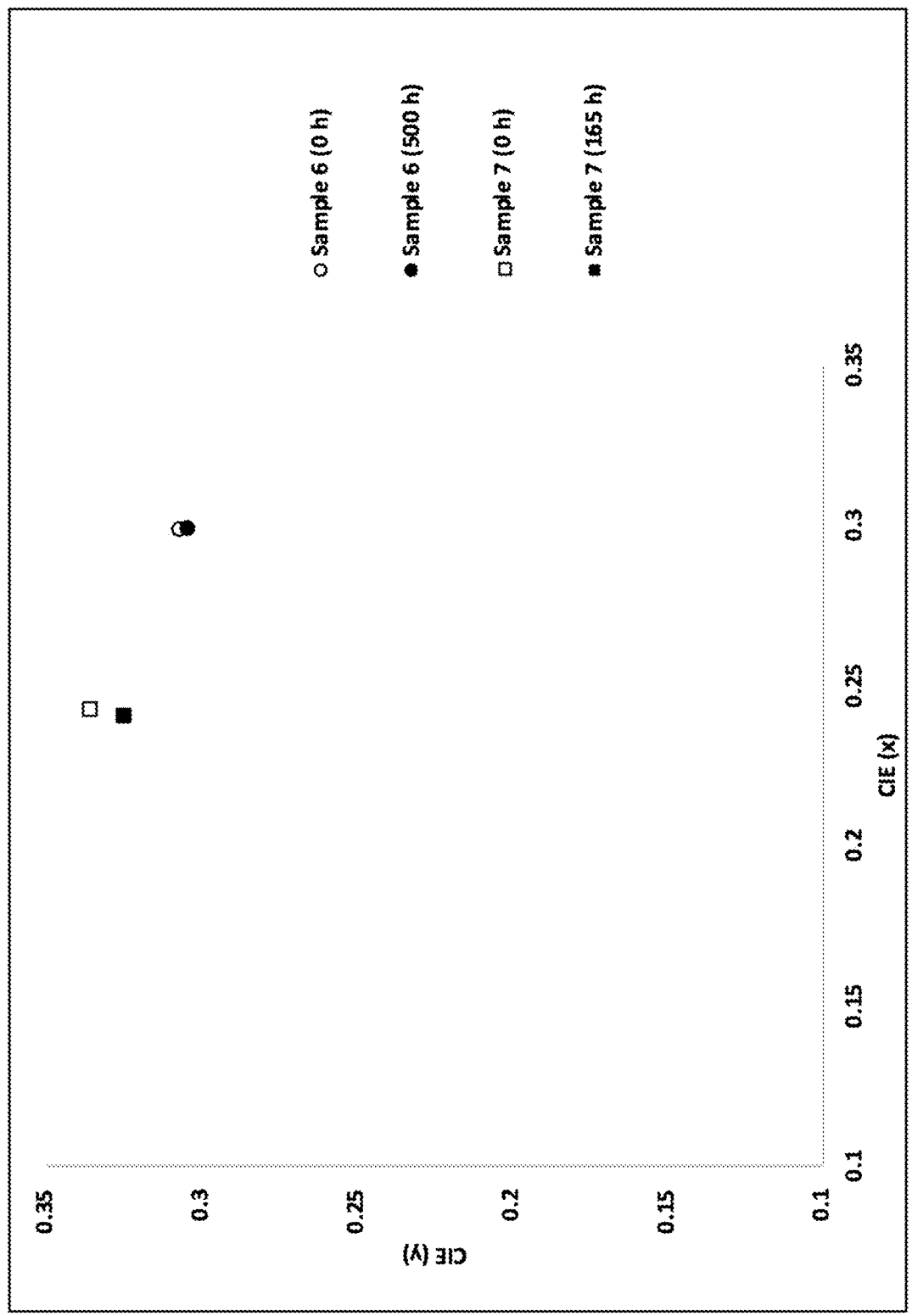
FIG. 10 is a white point position movement for samples 6 and 7 in 85° C. aging test for 500 h upon blue light flux condition-1 (0.16 $W/m^2$)

In this example, another important parameter, the ratio of Cd:Se in quantum dots, was examined for 85° C. weathering condition with blue light flux condition (0.16 W/m$^2$). Two samples with the only difference in Cd:Se wt % of green quantum dots were aged for 500 hours, sample 6 (i.e., 8:1) and sample 7 (i.e., 2:1), respectively, while the organic fraction was constant (i.e., ~37%) (Table 3). The Cd:Se ratio (wt %) and organic fraction of red quantum dots were maintained at 8:1 and ~40%. According to the Abs. QY measurement, sample 6 retained its 100% original Abs. QY, whereas sample 7 with a lower ratio of Cd:Se resulted in rapid degradation to less than 90% of its original value. The retention of properties for sample 6 is believed to be the result of more Cd atoms distributed in the shell layer, enhancing the quantum dot robustness under high temperature condition (FIG. 9). The benefit of the higher Cd:Se ratio was also revealed in the white point position in CIE chromaticity diagram, which showed more than 0.01 deviation in the CIE coordinates (FIG. 10).

TABLE 4

Elemental composition, organic fraction and emissive characters of examples in 85° C. aging test for 500 h upon blue light flux condition-1 (0.16 W/m$^2$):

| | Sample 6 | Sample 7 |
|---|---|---|
| Cd:Se (wt %) of GQDs | 23.0:3.0 (~8:1) | 19.7:8.1 (~2:1) |
| Organic fraction (wt %) of GQDs | 39.7 | 36.0 |
| Retention % of Abs. QY in 85° C. aging test | 102.0% | 88.9% (160 h) |
| Δ CIE (x, y) in 85° C. aging test | <0.01 | >0.01 |

Example 5. Reliability Study of a Quantum Dot Film with Different Cd:Se Ratio Under 85° C. Aging & Blue Light Flux Condition-2 (1.47 W/m$^2$)

Figure 11:
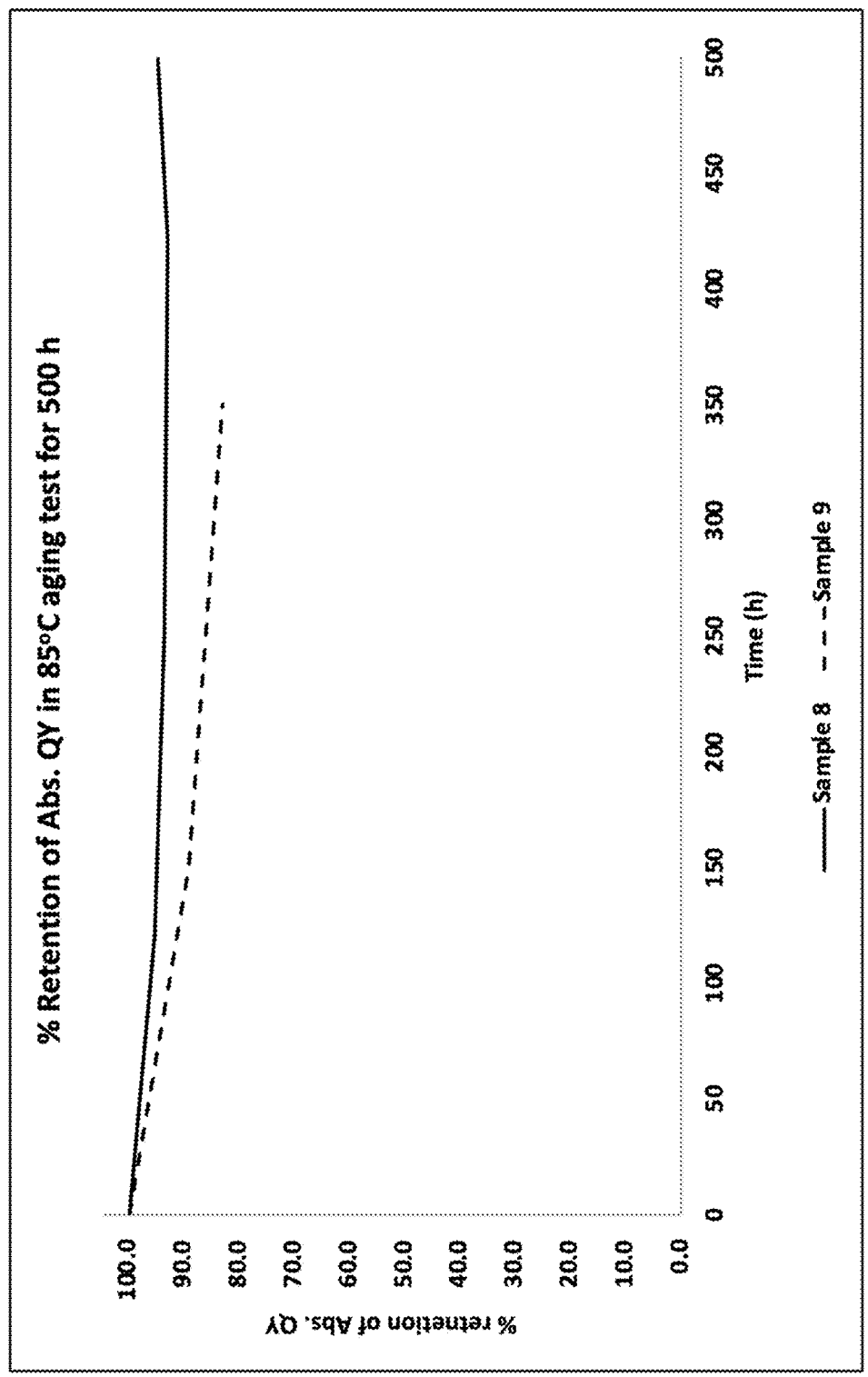
FIG. 11 is a reliability study showing the change in % retention of Abs, QY during aging with different composition of green QDs under 85° C. & blue light flux condition-2 (1.47 $W/m^2$)
Figure 12:
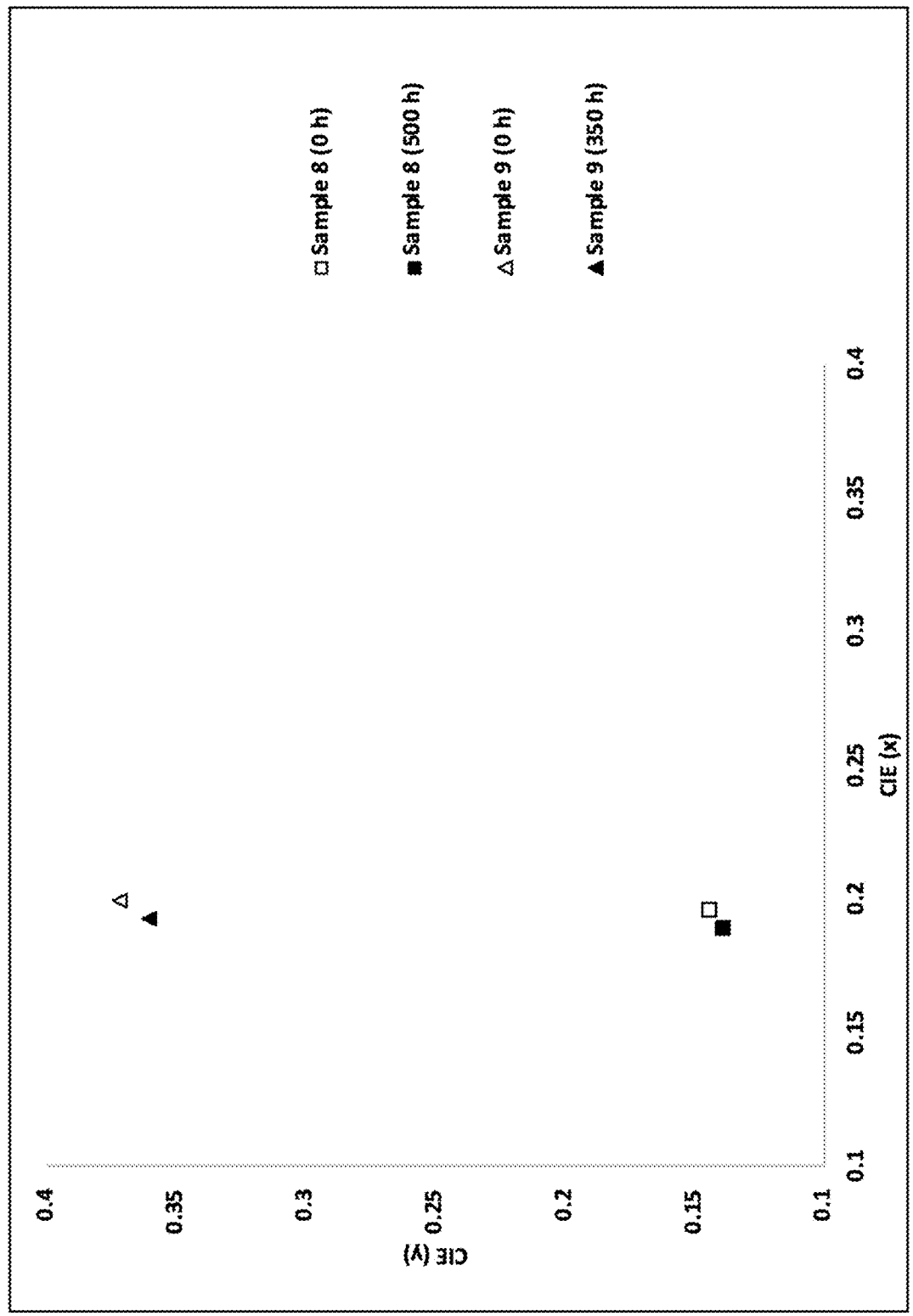
FIG. 12 is a white point position movement for samples 8 and 9 in 85° C. aging test for 500 h upon blue light flux condition-2 (1.47 $W/m^2$)

To further demonstrate the effect of Cd:Se ratio on QD film stability, two more samples with similar organic fractions (~26%) were aged for 500 hours under 85° C. with blue light flux (1.47 W/m$^2$). The Cd:Se ratio (wt %) and organic fraction of red quantum dots were maintained at 8:1 and ~40%. The only difference in the two samples was the Cd:Se wt % of green quantum dots, namely sample 8 (i.e., 8:1) and 9 (i.e., 2:1), respectively (Table 5). As expected, sample 8 with a higher Cd:Se ratio was found to be stable after 500 hours aging and retained more than 90% of its original Abs. QY (FIG. 11). A similar change of CIE coordinates was observed as its counterparts at blue light flux condition-1 (FIG. 12).

TABLE 5

Elemental composition, organic fraction and emissive characters of examples in 85° C. aging test for 500 h upon blue light flux condition-2 (1.47 W/m$^2$)

| | Sample 8 | Sample 9 |
|---|---|---|
| Cd:Se (wt %) of GQDs | 24.0:3.0 (~8:1) | 22.8:11.1 (~2:1) |
| Organic fraction (wt %) of GQDs | 25.6 | 26.0 |
| Retention % of Abs. QY in 85° C. aging test | 95.1% | 83.2% (350 h) |
| Δ CIE (x, y) in 85° C. aging test | <0.01 | >0.01 |

Example 6. Reliability Study of Quantum Dot Film with Particular Cd:Se Ratio and Organic Fraction in Green Quantum Dots Under Different Weathering and Blue Light Flux Condition-3 (50 W/m$^2$)

Figure 13:
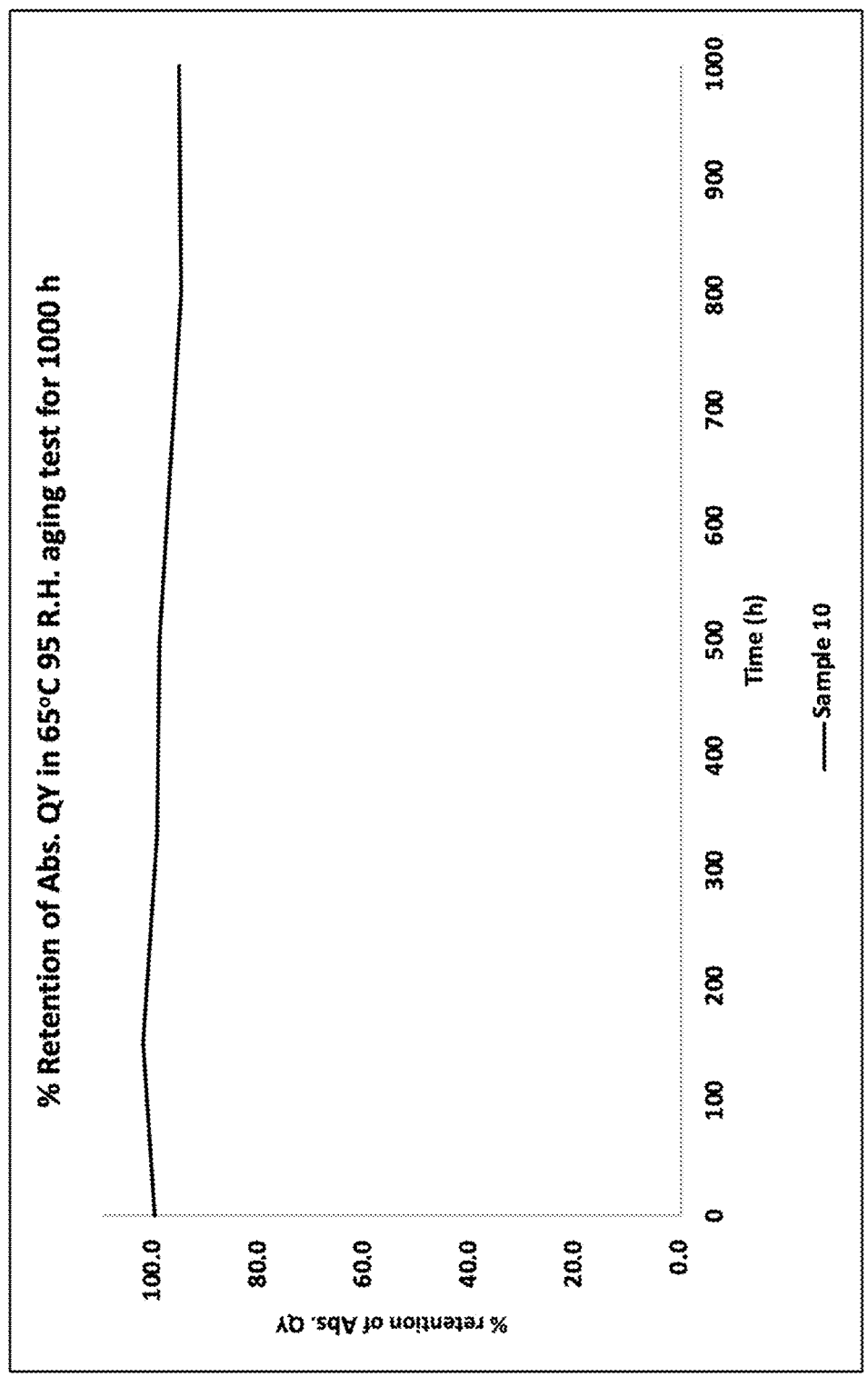
FIG. 13 is a reliability study showing the effects of particular organic fractions and compositions of green QDs under 65° C. at 95% R.H. & blue light flux condition-3 (50 W/m$^2$)
Figure 14:
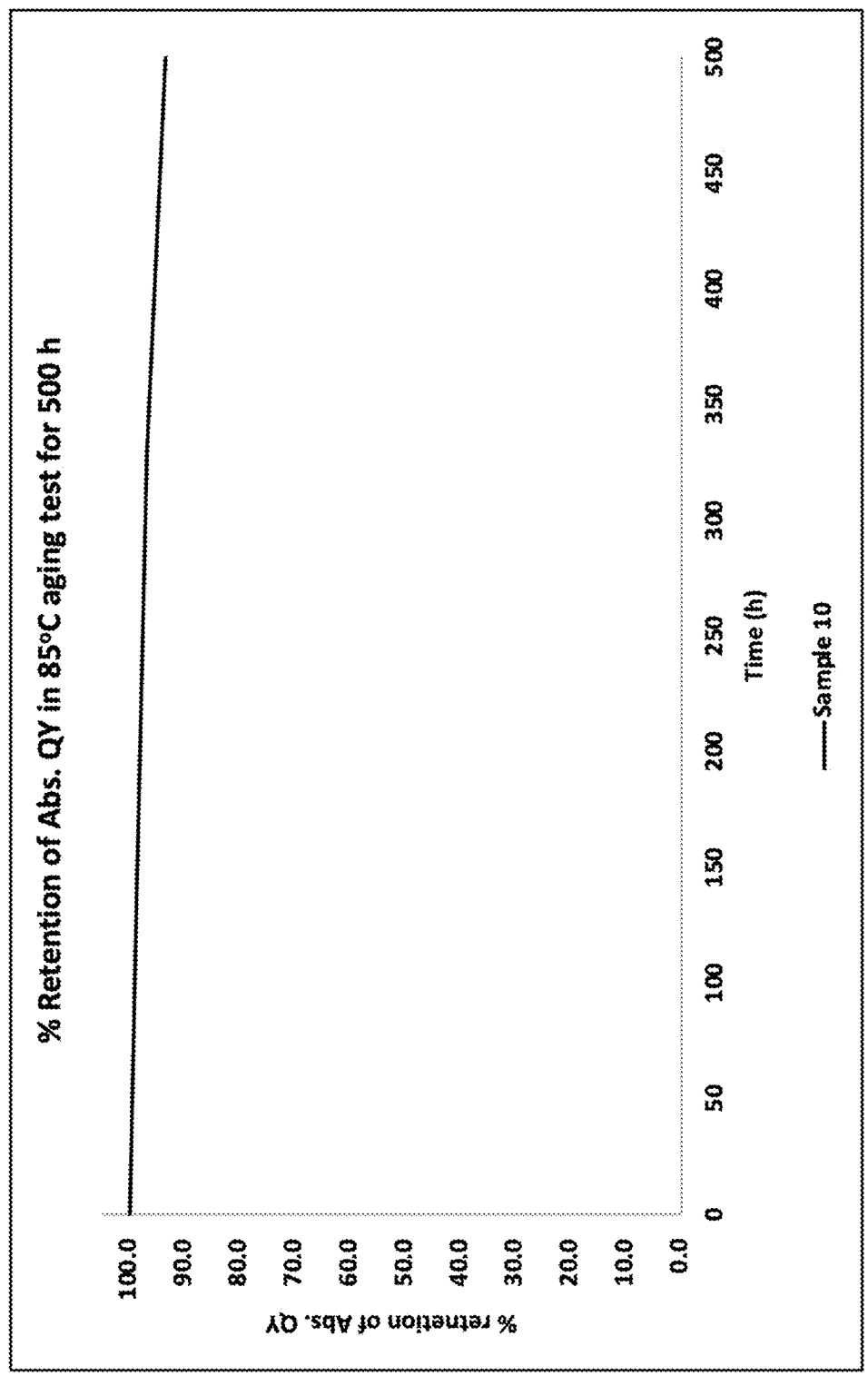
FIG. 14 is a reliability study showing the effects of particular organic fractions and compositions of green QDs under 85° C. & blue light flux condition-3 (50 W/m$^2$)
Figure 15:
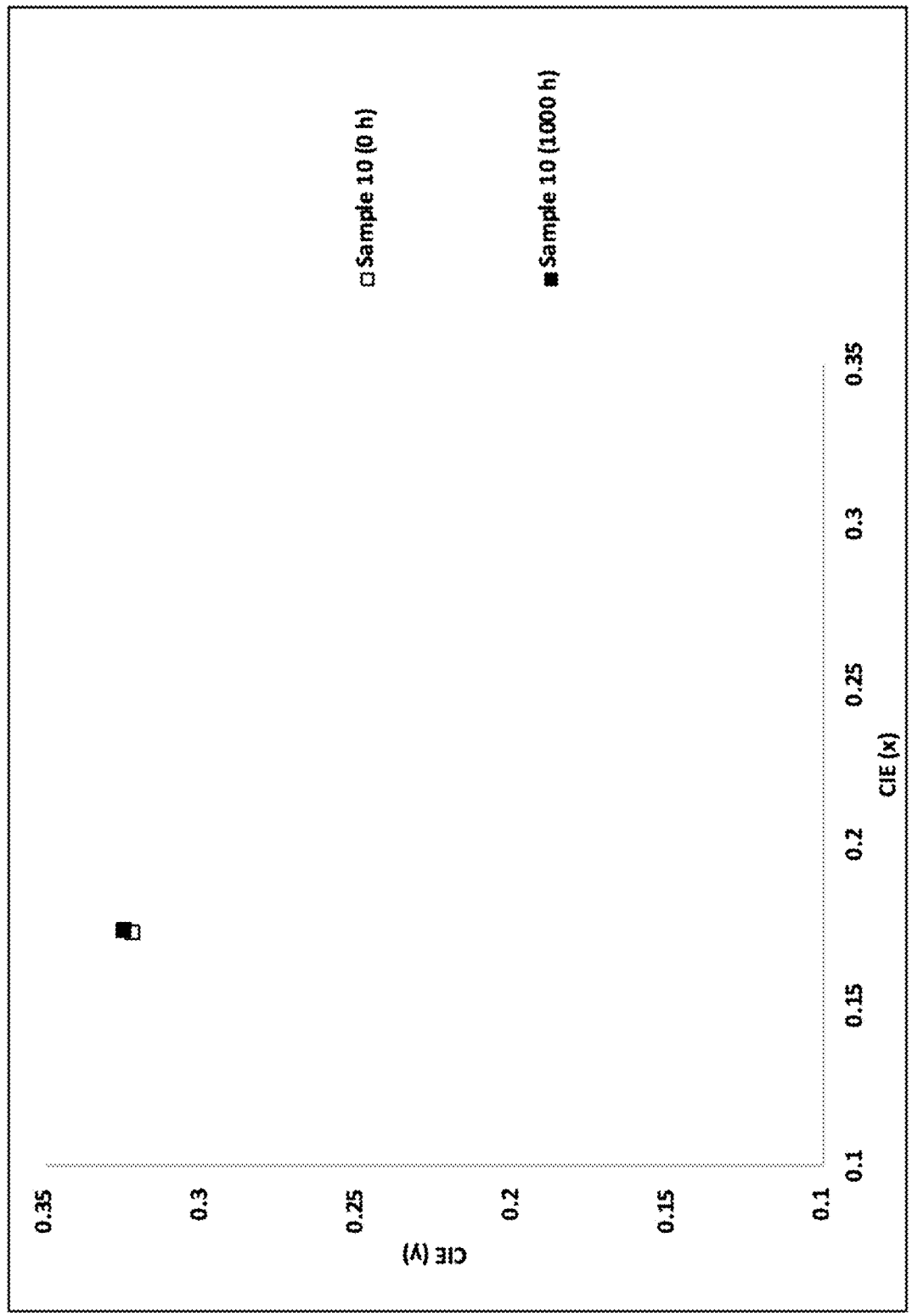
FIG. 15 is a white point position movement for samples 10 in 65° C. at 95% R.H. aging test for 1000 h upon blue light flux condition-3 (50 W/m$^2$)
Figure 16:
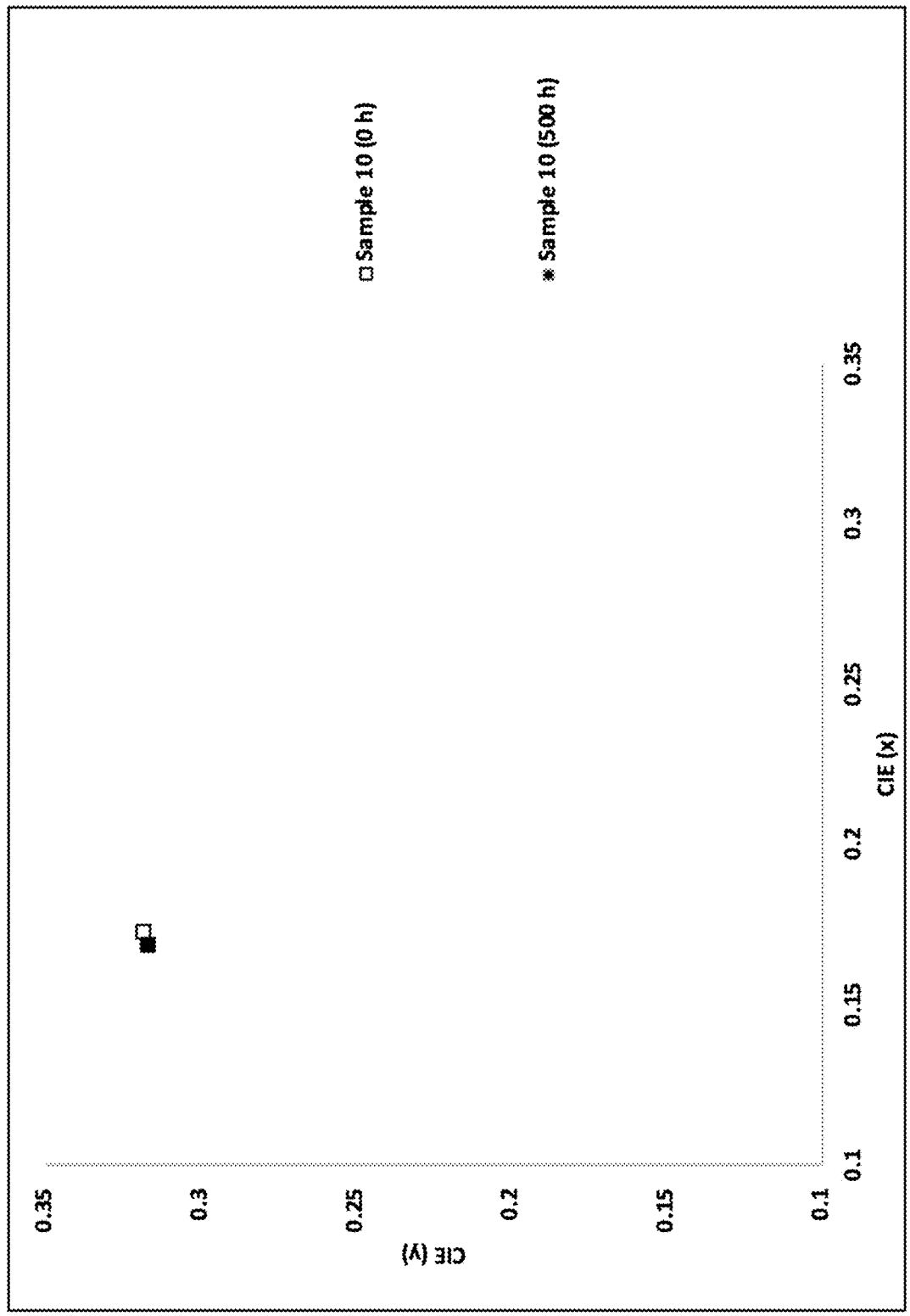
FIG. 16 is a white point position movement for samples 10 in 85° C. aging test for 500 h upon blue light flux condition-3 (50 W/m$^2$)

In this example, the combined effect of a particular Cd:Se ratio and organic fraction on the quantum dot film stability was demonstrated at both 65° C., 95% R.H. and 85° C. weathering conditions, with a blue light flux condition of 50 W/m$^2$. This blue light flux is much more intense than that used in the above examples. In sample 10, the Cd:Se ratio and organic fraction were controlled at ~8:1 and 33.0%, respectively. The effect of the Cd:Se composition showed a retention of 93.5% of original Abs. QY in QD film, which indicated the importance of the Cd:Se ratio in increasing the stability of QD film in high temperature conditions (FIGS. 14 and 16). In contrast, the effect of a sufficient organic fraction showed minimal change in the 1000 hours of high humidity aging test. Sufficient organic fraction allowed the retention of 95.3% of original Abs. QY and less than 0.01 CIE coordinate change in QD film (FIGS. 13 and 15).

TABLE 6

Elemental composition, organic fraction and emissive characters of example in 65° C. at 95% R.H. & 85° C. aging test upon blue light flux condition-3 (50 W/m$^2$)

| | Sample 10 |
|---|---|
| Cd:Se (wt %) of GQDs | 27.3:2.8 (~8:1) |
| Organic fraction (wt %) of GQDs | 33.0 |
| Retention % of Abs. QY in 65° C. at 95% R.H. aging test | 95.3% (500 h) |
| Δ CIE (x, y) in 65° C. at 95% R.H. aging test | <0.01 |
| Retention % of Abs. QY in 85° C. aging test | 93.5% |
| Δ CIE (x, y) in 85° C. aging test | <0.01 |

Example 7: Reliability Study of Quantum Dot Film with Particular Cd:Se Ratio and Organic Fraction in Green and Red Quantum Dots 50° C. Aging and Blue Light Flux Condition-4 (4000 W/m$^2$)

Figure 17:
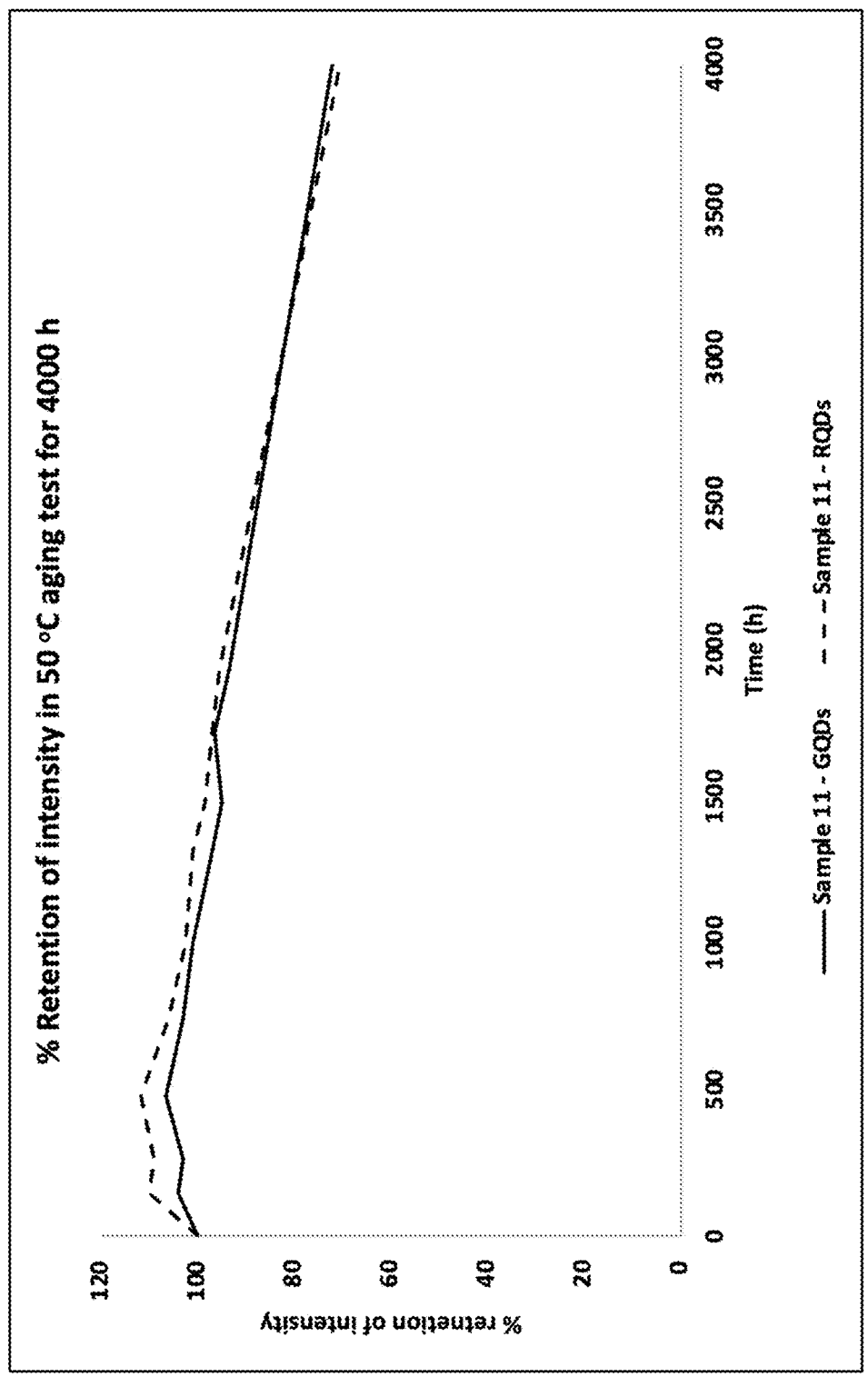
FIG. 17 is a reliability study showing the effects of particular organic fractions and compositions of green and red QDs under 50° C. & blue light flux condition-4 (4000 W/m$^2$)

In this example, the combined effect of a particular Cd:Se ratio and organic fraction on the quantum dot film stability was demonstrated at 50° C. weathering conditions, with a blue light flux condition of 4000 W/m$^2$. This blue light flux is much more intense than that used in the above examples. In sample 11, the Cd:Se ratio and organic fraction were similar to those in Table 6, respectively. The effect of the Cd:Se composition and sufficient organic fraction showed a retention at least 90% of original intensity after 1700 hours. After 4000 hours, the retention of intensity of the film was at least 70% (FIG. 17).

Figure 18:
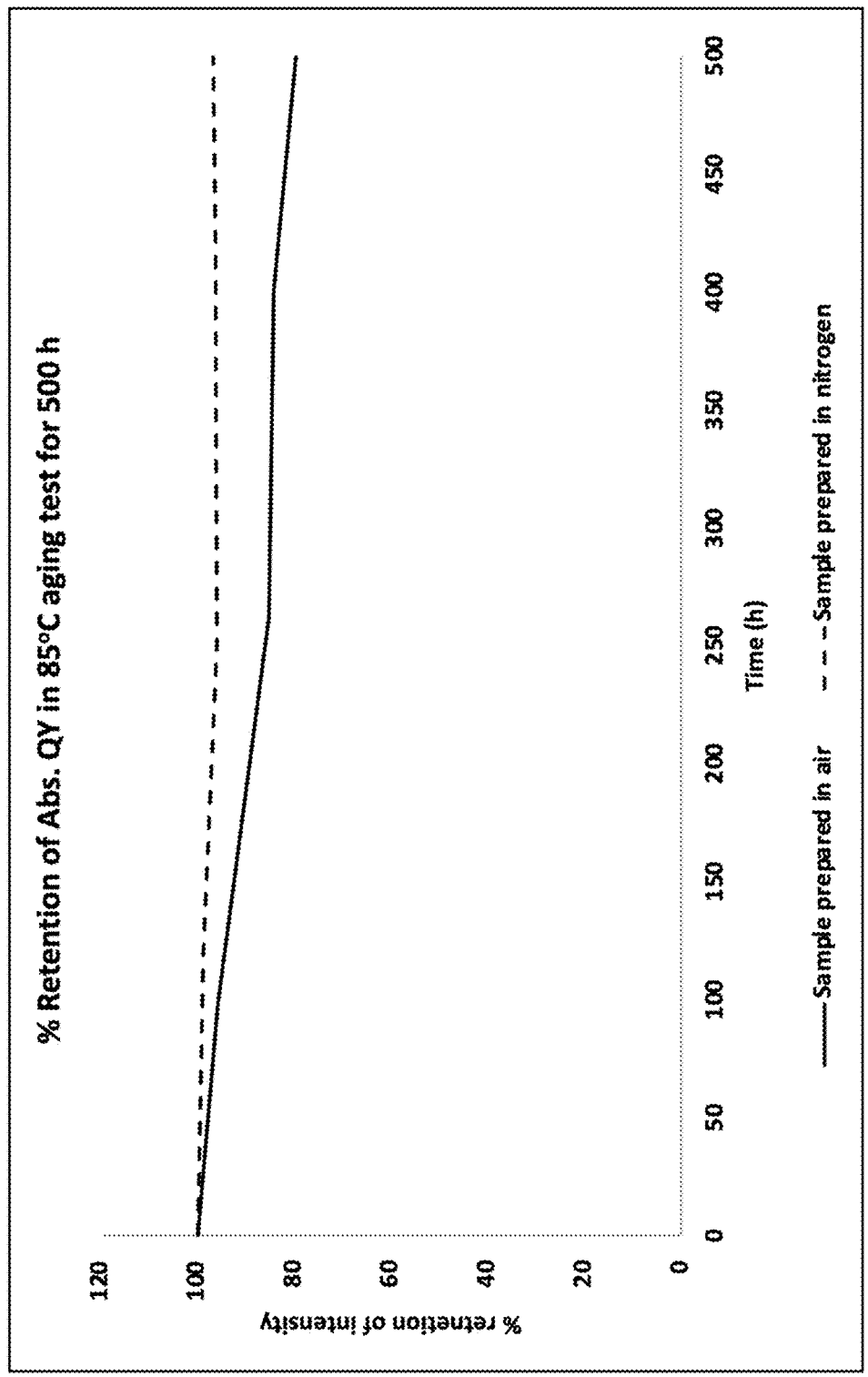
FIG. 18 is a reliability study showing the effects of particular organic fractions and compositions of green QDs under 85° C. & blue light flux condition-1 (0.16 W/m$^2$) with either air or nitrogen film preparation conditions.
Figure 19:
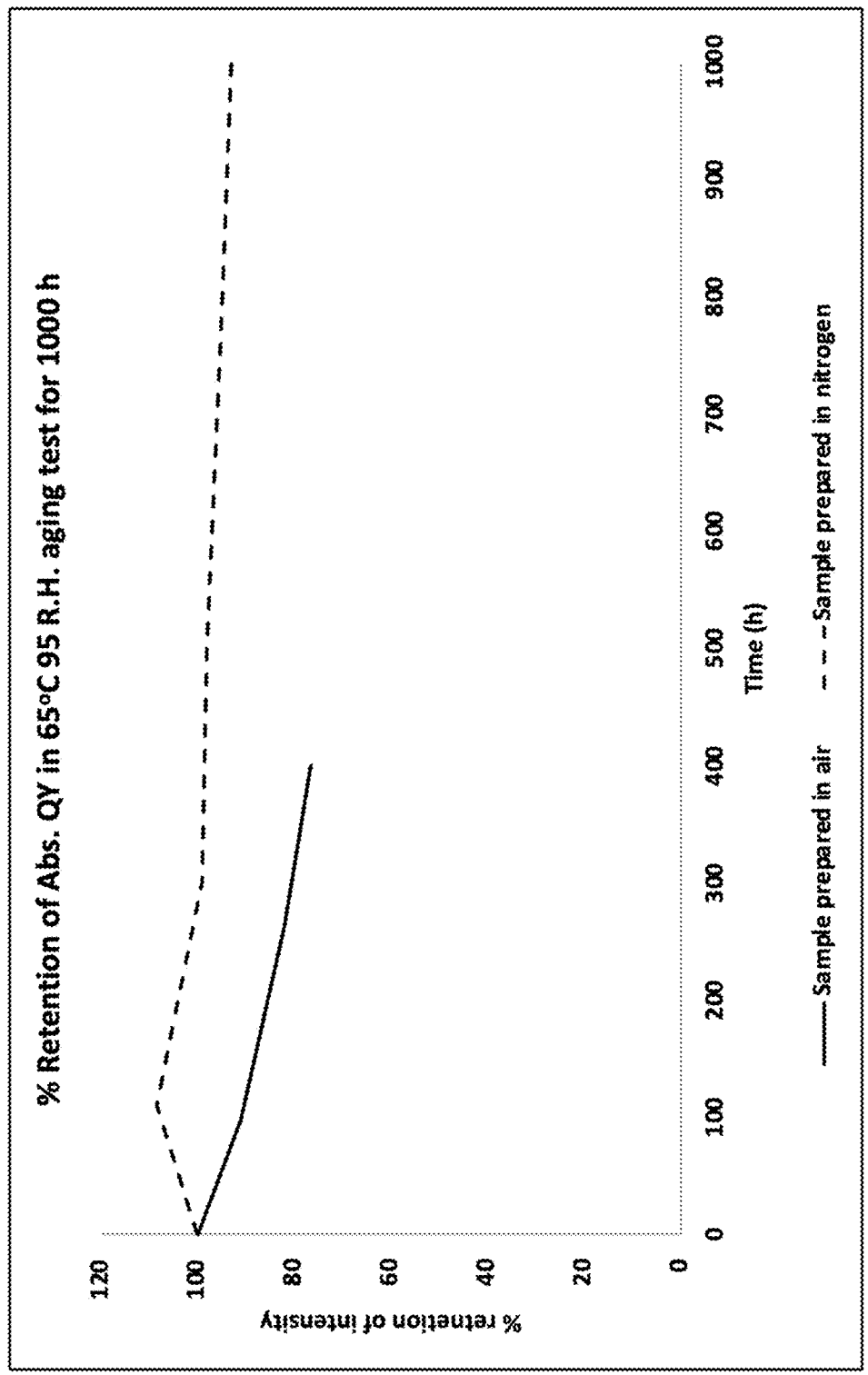
FIG. 19 is a reliability study showing the effects of particular organic fractions and compositions of green QDs under 65° C. at 95% R.H. & blue light flux condition-1 (0.16 W/m$^2$) with either air or nitrogen film preparation conditions.

Example 8. Reliability Study of Quantum Dot Film with Particular Cd:Se Ratio and Organic Fraction in Green Quantum Dots Under Different Weathering and Blue Light Flux Condition-1 (0.16 W/m$^2$) with Either Film Fabrication Under Oxygen or Nitrogen In this example, the effect of film preparation under oxygen and nitrogen (with no blue light) were demonstrated. In both 85° C. and 65° C. at 95% R.H. weathering conditions, the quantum dot film prepared in nitrogen showed at least 90% of retention of absolute quantum yield after 500 and 1000 hours respectively. Those prepared in oxygen showed relatively poor stabilities with less than 80% after 500 and 400 hours (FIGS. 18 & 19).

Figure 20:
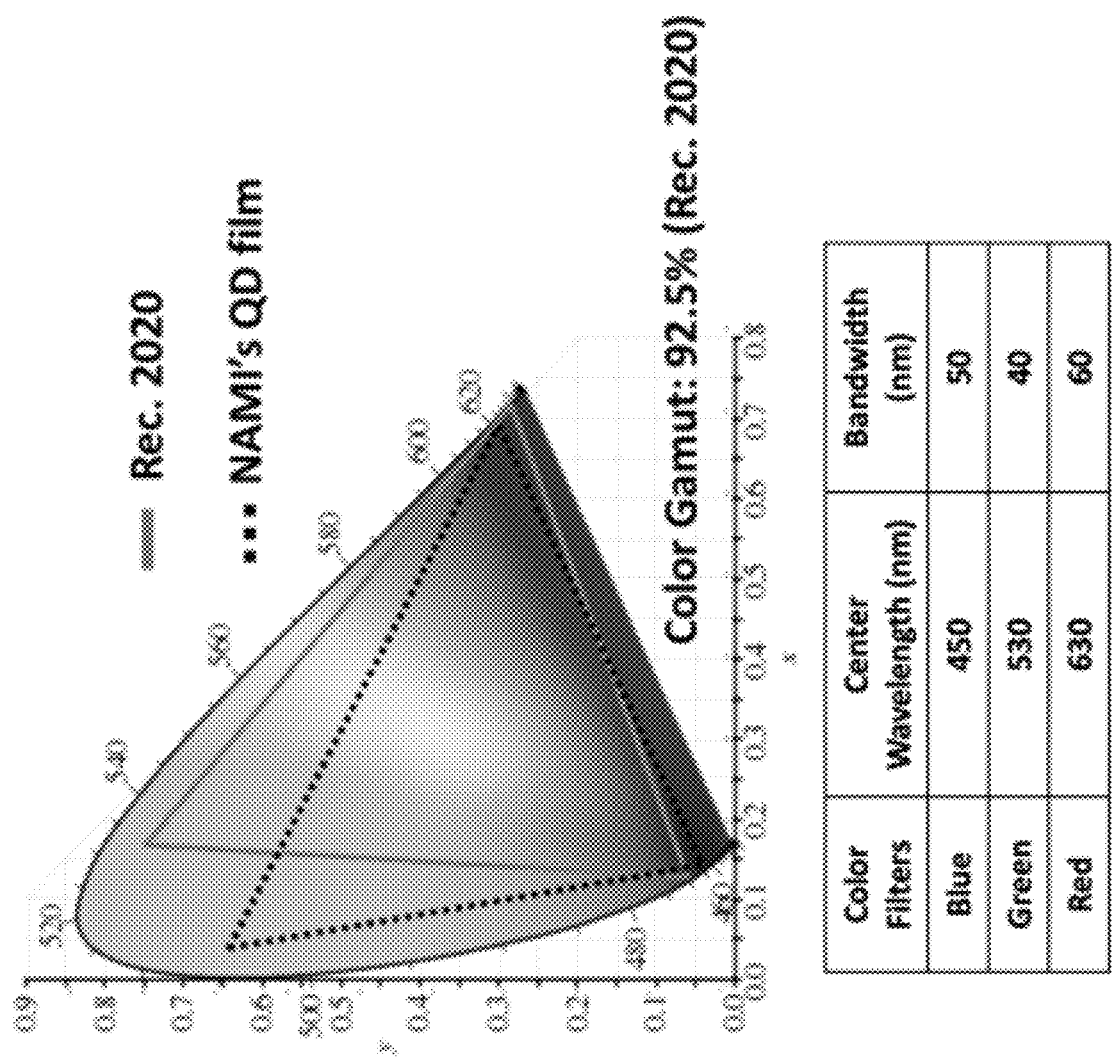
FIG. 20 shows CIE chromaticity coordinates of a display with a quantum dot-based light conversion layer with standard color RGB triangle (Rec.2020) and the table of color filter specification.

Example 9. Quantum Dot Film with Green and Red Quantum Dots for Photo-Conversion in Displays To exploit the exceptionally stable green and red QDs as QD film for color conversion, a prototype was built by replacing the color conversion film in a commercially available LCD panels. The fabricated film showed a color gamut of 92.5% of the standard Rec2020 in RGB triangle (FIG. 20).

ADVANTAGES/INDUSTRIAL APPLICABILITY

The present invention creates economical displays that include quantum-dot-based light conversion films with improved stability against and moisture under blue light illumination and heating. This technology is expected to reduce the cost in the light conversion film protection, eliminating the need for expensive barrier layers. The stability of quantum dots of the present invention is related to both the composition (i.e., Groups II:VI ratio) and the organic fraction surrounding the quantum dots creating a light conversion film that resists thermal and photo-degradation under high temperature and high humidity. The light conversion film for the display was found to maintain at least 90% of brightness retention and less than 0.01 color coordinate change in color gamut under the industrial recognized reliability tests:

1. 85° C. aging for 500 hours under blue light intensity from 0.16 to 50 W/m$^2$.
2. 65° C. at 95% relative humidity (R.H.) aging for 1000 hours under blue light intensity from 0.16 to 50 W/m$^2$.
3. 50° C. at 50-70% R.H. aging for at least 1700 hours under blue light intensity of 4000 W/m$^2$.

Further, the present invention requires no post-ligand exchange, and the quantum dot solution can be directly mixed with UV-curable polymers for fabrication of the light conversion film.

Based on the present invention, a display with an improved light conversion layer is formed having the following properties:

1. Enhancement of the thermal stability and moisture resistance in QD films under blue light illumination.
2. Improvement in color gamut.
3. No time-consuming post-treatment is required to further protect the QDs, such as ligand exchange.
4. Reduce the cost of display manufacturing by removing the barrier films.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A quantum dot-based color display comprising:
    a backlight unit including a light source and light source distribution layer, and
    a photo down-conversion light emissive layer comprising first and second populations of light-emitting Group II-VI core-shell structure quantum dots, at least a core portion of the light-emitting Group II-VI core-shell structure quantum dots having an excess amount of a Group II component, the Group II component in the core portion being in a weight ratio to a Group VI component in the core portion of approximately 6:1 or greater;
    the first population of the light-emitting Group II-VI core-shell structure quantum dots emitting light in a wavelength range of approximately 510-530 nm and the second population of light-emitting Group II-VI core-shell structure quantum dots emitting light in a wavelength range of approximately of 630-640 nm;
    the light-emitting Group II-VI core-shell structure quantum dots including an organic fraction in an amount of approximately 20 weight percent to approximately 45 weight percent, the organic fraction including ligands bound to quantum dot surfaces, the ligands being attached to the quantum dot surfaces in an as-deposited state and including one or more long-chain fatty acids, the long-chain fatty acids each having an aliphatic tail of at least 13 carbon atoms;

first and second polymer films having a water vapor transmission rate of >1 g/m² day positioned on either side of the photo down-conversion light emissive layer, the photo down conversion light emissive layer exhibiting photo stability at a light intensity of either 0.16-50 W/m² in 65° C. at 95% relative humidity and 85° C. thermal weathering conditions, or 4000 W/m² in 50° C. at 50-70% relative humidity aging conditions;

a display panel cooperating with the back light unit, the display panel including a liquid crystal layer and a transistor-based switching matrix for driving the liquid crystal layer, two or more polarizers, and a screen layer.

2. The quantum dot-based color display as recited in claim 1, wherein the first and second polymer films are selected from one or more of polyethylene terephthalate, polyacrylonitrile, polyimide, or polyethylene naphthalate with a thickness of 20-100 um.

3. The quantum dot-based color display as recited in claim 2, wherein the first and second polymer films have a transparency of over 95%, and a haze value of less than 10%.

4. The quantum dot-based color display as recited in claim 1, wherein the long-chain fatty acids are selected from one or more of oleic acid, myristic acid, stearic acid, linoleic acid, elaidic acid and palmitic acid.

5. The quantum dot-based color display as recited in claim 1, wherein the first and second populations of light-emitting Group II-VI core-shell structure quantum dots are dispersed in a UV-curable polymer matrix to form the photo down-conversion light emissive layer.

6. The quantum dot-based color display as recited in claim 1, wherein the photo down-conversion light emissive layer exhibits less than 5% shift in luminescence efficiency and less than 0.01 CIE color change upon aging in 65° C. at 95% RH for at least 1000 hours at blue light irradiance of 0.1-1.5 W/m².

7. The quantum dot-based color display as recited in claim 1, wherein the photo down-conversion light emissive layer exhibits less than a 10% shift in luminescence efficiency and less than 0.01 CIE color change upon aging in 65° C. at 95% relative humidity for at least 1000 hours and 85° C. for 500 hours at blue light irradiance of 50 W/m².

8. The quantum dot-based color display as recited in claim 1, wherein the photo down-conversion light emissive layer exhibits less than 10% shift in luminescence efficiency and less than 0.01 CIE color change upon aging in 50° C. at 50-70% relative humidity for at least 1700 hours at blue light irradiance of 4000 W/m².

9. The quantum dot-based color display as recited in claim 1, wherein the photo down-conversion light emissive layer exhibits less than 30% shift in luminescence efficiency and less than 0.01 CIE color change upon aging in 50° C. at 50-70% relative humidity for at least 4000 hours at blue light irradiance of 4000 W/m².

10. The quantum dot-based color display as recited in claim 1, where the display achieves a color gamut of >85% of Rec.2020 color standard.

11. The quantum dot-based color display as recited in claim 1, wherein the light-emitting Group II-VI core-shell structure quantum dots are mixed with a UV-curable polymeric adhesive material under an inert atmosphere and ambient light conditions without light at a wavelength of 380-480 nm.

12. The quantum dot-based color display as recited in claim 1, wherein the light source is a light-emitting diode light source.

13. The quantum dot-based color display as recited in claim 12, wherein the light-emitting diode light source emits blue light.

14. The quantum dot-based color display as recited in claim 1, wherein the first and second polymer films are selected from one or more of polyethylene terephthalate, polyethylene, polyimide, polyether sulfone, polyethylene naphthalate, polyacrylonitrile or polypropylene.

15. A quantum dot-based color display comprising:

a backlight unit including a light source and light source distribution layer, and a photo down-conversion light emissive layer comprising first and second populations of light-emitting Group II-VI core-shell structure quantum dots, at least a core portion of the light-emitting Group II-VI core-shell structure quantum dots having an excess amount of a Group II component, the Group II component in the core portion being in a weight ratio to a Group VI component in the core portion of approximately 6:1 or greater, and wherein the Group II component includes cadmium;

the first population of the light-emitting Group II-VI core-shell structure quantum dots emitting light in a wavelength range of approximately 510-530 nm and the second population of light-emitting Group II-VI core-shell structure quantum dots emitting light in a wavelength range of approximately of 630-640 nm;

the light-emitting Group II-VI core-shell structure quantum dots including an organic fraction in an amount of approximately 20 weight percent to approximately 45 weight percent, the organic fraction including ligands bound to quantum dot surfaces, the ligands being attached to the quantum dot surfaces in an as-deposited state and including one or more long-chain fatty acids, the long-chain fatty acids each having an aliphatic tail of at least 13 carbon atoms;

first and second polymer films having a water vapor transmission rate of >1 g/m² day positioned on either side of the photo down-conversion light emissive layer, the photo down conversion light emissive layer exhibiting photo stability at a light intensity of either 0.16-50 W/m² in 65° C. at 95% relative humidity and 85° C. thermal weathering conditions, or 4000 W/m² in 50° C. at 50-70% relative humidity aging conditions;

a display panel cooperating with the back light unit, the display panel including a liquid crystal layer and a transistor-based switching matrix for driving the liquid crystal layer, two or more polarizers, and a screen layer.

* * * * *